US011356842B2

(12) United States Patent
Lovlekar et al.

(10) Patent No.: US 11,356,842 B2
(45) Date of Patent: Jun. 7, 2022

(54) THROUGHPUT AND RADIO RESOURCE UTILIZATION FOR USER EQUIPMENT HAVING MULTIPLE SUBSCRIBER IDENTITY MODULES

(71) Applicant: Apple Inc., Cupertino, CA (US)

(72) Inventors: Srirang A. Lovlekar, Fremont, CA (US); Sethuraman Gurumoorthy, San Jose, CA (US); Murtaza A. Shikari, Mountain View, CA (US); Srinivasan Nimmala, San Jose, CA (US); Sree Ram Kodali, San Jose, CA (US); Fangli Xu, Beijing (CN); Haijing Hu, Los Gatos, CA (US); Yuqin Chen, Beijing (CN); Dawei Zhang, Saratoga, CA (US); Longda Xing, San Jose, CA (US); Zhiwei Wang, Beijing (CN); Yaoqi Yan, Beijing (CN); Muthukumaran Dhanapal, Sunnyvale, CA (US); Huarui Liang, Beijing (CN)

(73) Assignee: Apple Inc., Cupertino, CA (US)

( * ) Notice: Subject to any disclaimer, the term of this patent is extended or adjusted under 35 U.S.C. 154(b) by 46 days.

(21) Appl. No.: 16/923,835

(22) Filed: Jul. 8, 2020

(65) Prior Publication Data

US 2021/0014667 A1  Jan. 14, 2021

(30) Foreign Application Priority Data

Jul. 12, 2019 (CN) .......................... 201910626914.1

(51) Int. Cl.
*H04W 48/18* (2009.01)
*H04W 8/18* (2009.01)
(Continued)

(52) U.S. Cl.
CPC ........... *H04W 8/183* (2013.01); *H04W 12/72* (2021.01); *H04W 48/18* (2013.01); *H04W 88/06* (2013.01)

(58) Field of Classification Search
CPC ..... H04W 8/183; H04W 12/72; H04W 48/18; H04W 88/06; H04W 52/0216;
(Continued)

(56) References Cited

U.S. PATENT DOCUMENTS 7,912,497 B2  3/2011  Isidore et al.
8,385,893 B2  2/2013  Gupta et al.
(Continued)

FOREIGN PATENT DOCUMENTS

WO   2016093964 A1   6/2016

OTHER PUBLICATIONS

Partial European Search Report For Patent Application No. EP20185436; dated Nov. 2, 2020; 15 Pages.
(Continued)

*Primary Examiner* — Julio R Perez
(74) *Attorney, Agent, or Firm* — Kowert, Hood, Munyon, Rankin & Goetzel, P.C.

(57) ABSTRACT

A user equipment (UE) includes first and second subscriber identity modules (SIMs), possibly subscribed to different carriers. When the first SIM is in a connected state and the second SIM is in an idle state, the UE may need to periodically tune away a radio from a first frequency used for communication under the first SIM to a second frequency used for idle mode activity under the second SIM. The UE may provide to the network of the first SIM the second SIMs traffic activity pattern and/or serving frequency so that the network may provide coordinated configuration and/or scheduling for the UE device, e.g., in order to make the action of tuning away (and tuning back) the radio more
(Continued)

efficient and/or to decrease the network impact of such radio tune aways (e.g., to decrease wasted uplink scheduling and wasted downlink transmissions for the first SIM).

20 Claims, 14 Drawing Sheets

(51) Int. Cl.
   *H04W 88/06* (2009.01)
   *H04W 12/72* (2021.01)
(58) Field of Classification Search
   CPC . H04W 36/0069; H04W 76/14; H04W 76/28; H04W 60/005; H04W 24/02; H04W 24/08; H04W 68/02
   See application file for complete search history.

(56) References Cited

U.S. PATENT DOCUMENTS

| | | | |
|---|---|---|---|
| 8,849,350 B1 * | 9/2014 | Batchu | H04W 8/183 |
| | | | 455/558 |
| 9,037,168 B2 | 5/2015 | Hsu et al. | |
| 9,204,413 B2 | 12/2015 | Gouriou | |
| 9,402,274 B1 * | 7/2016 | Rajurkar | H04W 76/15 |
| 9,986,479 B2 | 5/2018 | Zacharias et al. | |
| 11,229,075 B2 * | 1/2022 | Zhu | H04W 4/16 |
| 2013/0303181 A1 | 11/2013 | Rajurkar et al. | |
| 2013/0313181 A1 | 11/2013 | Zotov et al. | |
| 2014/0341184 A1 | 11/2014 | Dhanda et al. | |
| 2015/0282057 A1 * | 10/2015 | Li | H04B 7/0871 |
| | | | 455/552.1 |
| 2015/0289314 A1 * | 10/2015 | Yang | H04W 56/0045 |
| | | | 455/552.1 |
| 2018/0063881 A1 * | 3/2018 | Shah | H04L 5/0048 |
| 2018/0184309 A1 | 6/2018 | Bhardwaj et al. | |
| 2018/0234878 A1 | 8/2018 | Anand et al. | |
| 2018/0249349 A1 * | 8/2018 | Hu | H04W 76/28 |
| 2021/0250828 A1 * | 8/2021 | Vaidya | H04W 76/28 |
| 2021/0345454 A1 * | 11/2021 | Dhanapal | H04W 80/08 |

OTHER PUBLICATIONS

Extended European Search Report for Patent Application No. EP 20185436; dated Feb. 12, 2021; 15 Pages.

* cited by examiner

*880*

in response to determining that a first of the SIMs is entering or has entered a connected state and that a second of the SIMs is entering or has entered an idle state, direct a radio subsystem of the wireless UE device to transmit page scheduling information to a wireless network corresponding to the first SIM, wherein the page scheduling information indicates a sequence of temporal intervals at least for monitoring pages from a wireless network corresponding to the second SIM 885 during the connected state of the first SIM and the idle state of the second SIM, control an RF chain of the radio subsystem to support a data transfer process for the first SIM and page monitoring for the second SIM, wherein the page monitoring is performed only during the temporal intervals, wherein the data transfer process has either an uplink direction or a downlink direction, and occurs only outside the temporal intervals 890

*FIG. 8C*

1400 receive a reconfiguration message from a first wireless network corresponding to a first of the SIMs *1410* in response to receiving the reconfiguration message, reconfigure a serving cell frequency for a data connection of the first SIM with the first wireless network, to decrease or eliminate frequency re-tuning events on an RF chain that supports both the data connection of the first SIM and monitoring of pages of a second wireless network associated with a second of the SIMs *1415*

*FIG. 14*

1500 receive a configuration message from the first wireless network, wherein the configuration message includes an indication of a denial probability threshold *1510* in response to receiving the configuration message, controlling a percentage of time an RF chain of the radio subsystem is tuned away from a first frequency corresponding to a connection with the first wireless network to a second frequency of the second wireless network, wherein said controlling is based on said denial probability threshold *1515*

```
┌─────────────────────────────────────────────────────────────┐
│ select at least one of a first RF chain and a second RF chain of the radio │
│ subsystem that is to be subjected to idle mode activity for the second SIM │
│ during a dual connectivity (DC) state of the first SIM  _1610_ │
└─────────────────────────────────────────────────────────────┘
                              ↓
┌─────────────────────────────────────────────────────────────┐
│ direct the radio subsystem to transmit a selection indicator to a first │
│ wireless network associated with the first SIM, wherein the selection │
│ indicator indicates a selection of at least one of a master cell group │
│ (MCG) and a secondary cell group (SCG) corresponding to the dual │
│ connectivity state of the first SIM, wherein the selection indicated by the │
│ selection indicator is determined based on said selecting at least one of │
│ the first RF chain and the second RF chain  _1615_ │
└─────────────────────────────────────────────────────────────┘
```

```
┌─────────────────────────────────────────────────────────────┐
│ create a user data record for a UE device having a plurality of subscriber │
│ identity modules (SIMs), wherein the user data record is linked to first │
│ SIM information and second SIM information for the UE device  _1710_ │
└─────────────────────────────────────────────────────────────┘
                              ↓
┌─────────────────────────────────────────────────────────────┐
│ in response to establishing a first call to or from a first mobile number │
│ associated with the first SIM information, set the data record to a busy │
│ state  _1715_ │
└─────────────────────────────────────────────────────────────┘
                              ↓
┌─────────────────────────────────────────────────────────────┐
│ in response to receiving, while the data record is in the busy state, a │
│ second call that targets a second mobile number associated with the │
│ second SIM information, refrain from paging the second mobile number at │
│ least for a period of time  _1720_ │
└─────────────────────────────────────────────────────────────┘
```

*FIG. 17*

THROUGHPUT AND RADIO RESOURCE UTILIZATION FOR USER EQUIPMENT HAVING MULTIPLE SUBSCRIBER IDENTITY MODULES

PRIORITY CLAIM INFORMATION

This application claims the benefit of priority to Chinese Patent Application No. 201910626914.1, filed Jul. 12, 2019, titled "Improved Throughput and Radio Resource Utilization for User Equipment Having Multiple Subscriber Identity Modules", which is hereby incorporated by reference in its entirety as though fully and completely set forth herein.

FIELD

The present disclosure relates to the field of wireless communication, and more particularly, to mechanisms capable of increasing the throughput and/or improving radio resource utilization for user equipment (UE) devices having a plurality of subscriber identity modules and for networks that communicate with such UE devices.

DESCRIPTION OF THE RELATED ART

Wireless communication systems are rapidly growing in usage. Further, wireless communication technology has evolved from voice-only communications to also include the transmission of data, such as Internet and multimedia content. To enable a wireless device to access a wireless communication network (e.g., a cellular telecommunication network) according to at least some wireless communication technologies and standards, a user may subscribe to a service provider (a "carrier"), who in turn may provide such services to the user, e.g., via a wireless communication network which they operate. Such subscribers in a wireless communication network are typically assigned subscriber identity information, which may for example be stored in a subscriber identity module (SIM) in the subscriber's wireless device. For example, many wireless devices may be provided with a slot for a removable subscriber identity module (SIM) card. Providing such a slot may enable users to select and/or change their subscriber identity independently from the wireless device, as the user may be able to switch out their current SIM card for a different SIM card at any given time, as desired. More recently, UE devices may come equipped with an eSIM (i.e., an electronic SIM, also known as an embedded SIM), wherein an embedded memory in the UE stores subscriber identity information for the user. As used herein, the term "subscriber identity module" includes within its scope of meaning the possibility that the subscriber identity module may be an eSIM or a removable SIM, unless otherwise specified.

Many UE devices today are being designed as dual SIM or multi-SIM devices, where the UE is capable of storing two or more sets of subscriber identity information for the user. (As used herein, the term "multi-SIM device" means a device including more than one SIM.) This enables the UE to, for example, store first subscriber identity information for a user's home telephone number and also store second subscriber identity information for the user's business telephone number. Dual SIM or multi SIM UE devices have been especially popular in more recently developing economies such as China.

One type of dual SIM UE is referred to as Dual SIM Dual Active (DSDA). A DSDA UE is capable of using two SIMs and two radios, so as to maintain two active sets of data communication simultaneously. For example, the UE may be conducting a voice call using one SIM while performing data communication (e.g., Internet browsing) on the second SIM.

Another type of dual SIM UE may be referred to as Dual SIM Dual Standby (DSDS), where only one SIM may be connected at any given time. Thus, when the UE is utilizing one SIM, e.g., for a voice call, the other SIM will be idle.

As discussed above, a UE may include two or more SIMs, to enable the UE to communicate under two or more corresponding wireless service subscriptions. Different SIMs may be registered to different carriers or to the same carrier. Different SIMs in a UE may be in different communication states. For example, a first SIM may be in a connected state while a second SIM may be in an idle state. The first SIM will require use of one or more RF chains to transmit and/or receive data to/from one or more base stations, e.g., two base stations in the case a dual connectivity scenario. The second SIM (in the idle state) will require use of at least one RF chain to monitor paging opportunities (or paging occasions).

In the case where the first and second SIMs are registered to different carriers, an RF chain of the UE may be subjected to periodic switching between a first frequency that supports data transfers associated with the connected state of the first SIM and a second frequency that supports page monitoring for the idle state of the second SIM. (Different carriers typically use different frequencies.) Thus, the UE will not be able to take advantage of any uplink grants for the first SIM during those periods of time when the RF chain is tuned away to the second frequency. Similarly, any downlink data transmitted by the network of the first SIM during those periods of time will be ignored since the first SIM doesn't have control of the RF chain.

Even in the case where the first and second SIM are registered to the same carrier, and thus, the same frequency may be used to support both the first SIM's connected mode data transfer and the second SIM's idle state page monitoring, precious time is consumed when the UE switches its attention from connected-state data transfers to page monitoring, and vice versa.

Therefore, there exists a fundamental need for mechanisms capable of improving the throughput and/or performance of user equipment devices that include more than one SIM, and of the networks that communicate with such user equipment devices.

SUMMARY

In one set of embodiments, a network node in a first wireless network may include: an interface to one or more base stations of the first wireless network; and a processing element operatively coupled to the interface. The processing element may be configured to receive, via the interface, an indication that a user equipment (UE) device has at least a first subscriber identity module (SIM) and a second SIM, where the first wireless network is associated with the first SIM. The processing element may be further configured to receive, via the interface, a serving frequency of a second wireless network associated with the second SIM, where the second wireless network is different from the first wireless network.

The processing element may be further configured to select a serving frequency of the first wireless network for use by the UE device based at least in part on the serving frequency of the second wireless network. The serving frequency of the first wireless network may be selected from a set of available frequencies of the first wireless network in order to increase a re-tune efficiency of radio hardware in the UE device.

The processing element may be further configured to transmit, via the interface, a reconfiguration message to the UE device, where the reconfiguration message includes the selected serving frequency of the first wireless network. The reconfiguration message may include an instruction to tune the radio hardware to the selected serving frequency for a connected-state data transfer of the first SIM.

In one set of embodiments, a wireless user equipment (UE) device may include: a radio subsystem for performing wireless communication; a processing element operatively coupled to the radio subsystem; and a plurality of subscriber identity modules (SIMs). Each of the subscriber identity modules may support access to a corresponding wireless network. The processing element may be configured to: receive a reconfiguration message from a first wireless network corresponding to a first of the SIMs; and in response to receiving the reconfiguration message, reconfigure a serving cell frequency for a data connection of the first SIM with the first wireless network, to decrease or eliminate frequency re-tuning events on an RF chain that supports both the data connection of the first SIM and monitoring of pages of a second wireless network associated with a second of the SIMs.

In one set of embodiments, a wireless user equipment (UE) device may include: a radio subsystem for performing wireless communication; a processing element operatively coupled to the radio subsystem; and a plurality of subscriber identity modules (SIMs). Each of the subscriber identity modules may support access to a corresponding wireless network. A first of the SIMs is associated with a first wireless network, and a second of the SIMs is associated with a second wireless network, different from the first wireless network. The processing element may be configured to receive a configuration message from the first wireless network, where the configuration message includes an indication of a denial probability threshold. In response to receiving the configuration message, the processing element may control a percentage of time an RF chain of the radio subsystem is tuned away from a first frequency, corresponding to a connection with the first wireless network, to a second frequency of the second wireless network. The action of controlling the time percentage may be based on the denial probability threshold.

In one set of embodiments, a wireless user equipment (UE) device may include: a radio subsystem for performing wireless communication; a processing element operatively coupled to the radio subsystem; and a plurality of subscriber identity modules (SIMs). Each of the subscriber identity modules may support access to a corresponding wireless network, where the SIMs include a first SIM and a second SIM. The processing element may be configured to select at least one of a first RF chain and a second RF chain of the radio subsystem that is to be subjected to idle mode activity for the second SIM during a dual connectivity (DC) state of the first SIM. The processing element may be further configured to direct the radio subsystem to transmit a selection indicator to a first wireless network associated with the first SIM. The selection indicator may indicate a selection of at least one of a master cell group (MCG) and a secondary cell group (SCG) associated with the dual connectivity state of the first SIM. The selection indicated by the selection indicator may be determined based on said selecting at least one of the first RF chain and the second RF chain.

In one set of embodiments, a network node in a wireless network may include: an interface configured to communicate with a base station of the wireless network; a processing element operatively coupled to the interface. The processing element may be configured to: create a data record for a user equipment (UE) device having a plurality of subscriber identity modules (SIMs), where the data record is linked to first SIM information and second SIM information of UE device. The first SIM information corresponds to a first SIM of the UE device, and the second SIM information corresponds to a second SIM of the UE device. In response to establishing a first call to or from a first mobile number associated with the first SIM information, the processing element may set the data record to a busy state. In response to receiving, while the data record is in the busy state, a second call that targets a second mobile number associated with the second SIM information, the processing element may refrain from paging the second mobile number at least for a period of time.

In one set of embodiments, a wireless user equipment (UE) device may include: a radio subsystem for performing wireless communication; a processing element operatively coupled to the radio subsystem; and a plurality of subscriber identity modules (SIMs). Each of the subscriber identity modules supports access to a corresponding wireless network. Furthermore, the processing element may be configured to: in response to determining that a first of the SIMs is entering or has entered a connected state and that a second of the SIMs is entering or has entered an idle state, direct the radio subsystem to transmit page scheduling information to the wireless network corresponding to the first SIM, wherein the page scheduling information indicates a periodic sequence of temporal intervals at least for monitoring pages from the wireless network corresponding to the second SIM; and during the connected state of the first SIM and the idle state of the second SIM, control an RF chain of the radio subsystem to support a data transfer process for the first SIM and page monitoring for the second SIM, wherein the page monitoring is performed only during the temporal intervals of the periodic sequence, wherein the data transfer process has either an uplink direction or a downlink direction, and occurs only outside the temporal intervals of the periodic sequence.

In another set of embodiments, a wireless base station of a first wireless network may include: a radio subsystem for performing wireless communication; a processing element operatively coupled to the radio subsystem. The processing element may be configured to: receive page scheduling information from a user equipment (UE) device, wherein the page scheduling information indicates a periodic sequence of temporal intervals associated with paging opportunities (or paging occasions) of a second wireless network different from the first wireless network; and in response to receiving the page scheduling information, control an RF chain of the radio subsystem to support a data transfer process associated with the UE device, wherein the data transfer process has either an uplink direction or a downlink direction, wherein data transfers of the data transfer process are scheduled only outside the periodic sequence of temporal intervals.

Embodiments of the disclosure may thus be directed to methods for improving throughput and/or radio resource utilization for multi-SIM UE devices, to a UE device configured to implement such a method, and/or to a non-transitory computer accessible memory medium storing program instructions executable by a processor to implement such a method. The UE device may include a radio (e.g., including one or more antennas and/or other radio components) for performing wireless communication. The UE device may also include a processing element configured to implement part or all of the method (e.g., by executing program instructions). The UE device may further include one or more user interface elements, such as a display. In addition, the UE device may include a non-transitory computer accessible memory medium, which may store program instructions executable by the UE.

BRIEF DESCRIPTION OF THE DRAWINGS

A better understanding of the present subject matter can be obtained when the following detailed description of the preferred embodiment is considered in conjunction with the following drawings.

FIG. 8C illustrates one embodiment of a method 880 for reducing page monitoring impact to connected mode performance of a UE device having more than one SIM, according to some embodiments.

FIG. 14 illustrates one embodiment of a method for operating a UE device, to decrease or eliminate radio re-tuning events, especially when an RF chain of the UE device is used to service both a connected mode SIM and an idle mode SIM of the UE device, according to some embodiments.

FIG. 15A illustrates one embodiment of a method for operating a UE device so that the percentage of time that an RF chain of the UE device is used to service an idle mode SIM is limited, according to some embodiments.

FIG. 16 illustrates one embodiment of a method for operating a UE device that enables a wireless network to increase scheduling efficiency when a first SIM of the UE device is in a connected mode and a second SIM of the UE device is in an idle mode, especially in the context of a dual connectivity connection, according to some embodiments.

FIG. 17 illustrates one embodiment of a method for operating a network node in order to handle a call with respect to an idle mode SIM of a UE device when a call with respect to a connected mode SIM of the UE device is already in progress, according to some embodiments.

Figure 1:
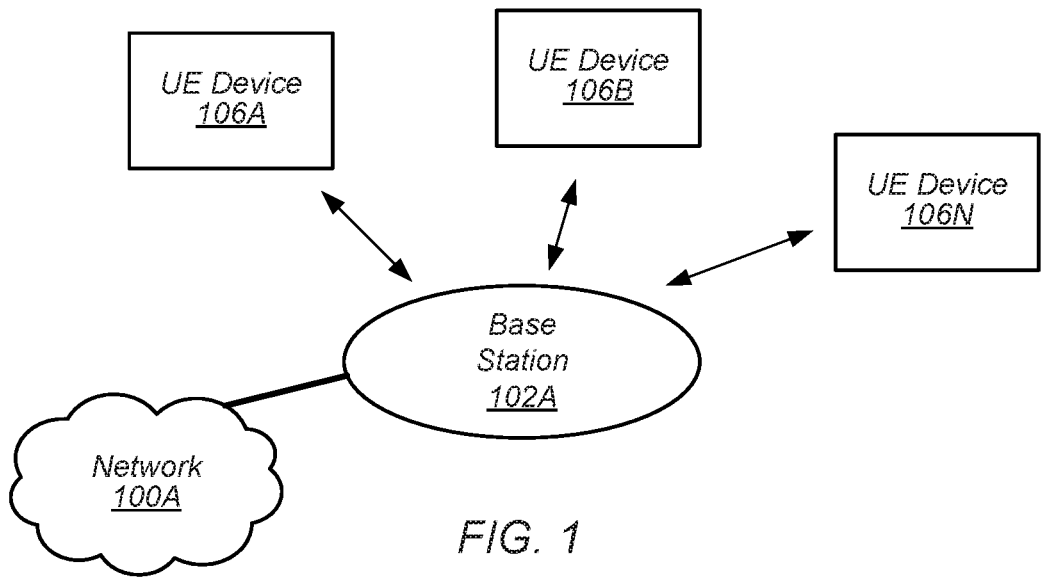
FIGS. 1-2 illustrate examples of wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in this disclosure.
3GPP: Third Generation Partnership Project
3GPP2: Third Generation Partnership Project 2
5G NR: $5^{th}$ Generation New Radio
ACK: Acknowledgement
ARQ: Automatic Repeat Request
DC: Dual Connectivity
DL: Downlink
DRB: (user) Data Radio Bearer
DRX: Discontinuous Reception
DSDS: Dual SIM Dual Standby
eNB (or eNodeB): Evolved Node B, i.e., the base station of 3GPP LTE
EN-DC: E-UTRA NR Dual Connectivity
eSIM: embedded SIM or electronic SIM
eUICC: embedded UICC
gNB (or gNodeB): next Generation NodeB, i.e., the base station of 5G NR
GSM: Global System for Mobile Communications
HARQ: Hybrid ARQ
KPI: Key Performance Indicator(s)
LTE: Long Term Evolution
LTE-A: LTE-Advanced
MAC: Medium Access Control
MAC-CE: MAC Control Element
MCG: Master Cell Group
MCS: Modulation & Coding Scheme MO: Mobile Originated
MR-DC: Multi-RAT DC
NR: New Radio
NR-DC: NR Dual Connectivity
NW: Network
RAT: Radio Access Technology
RLC: Radio Link Control
RRC: Radio Resource Control
SCG: Secondary Cell Group
SIM: Subscriber Identity Module
SRB: Signalling Radio Bearer
UE: User Equipment
UICC: Universal Integrated Circuit Card
UL: Uplink
UMTS: Universal Mobile Telecommunications System
USIM: UMTS SIM Terms The following is a glossary of terms used in this disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to any of various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
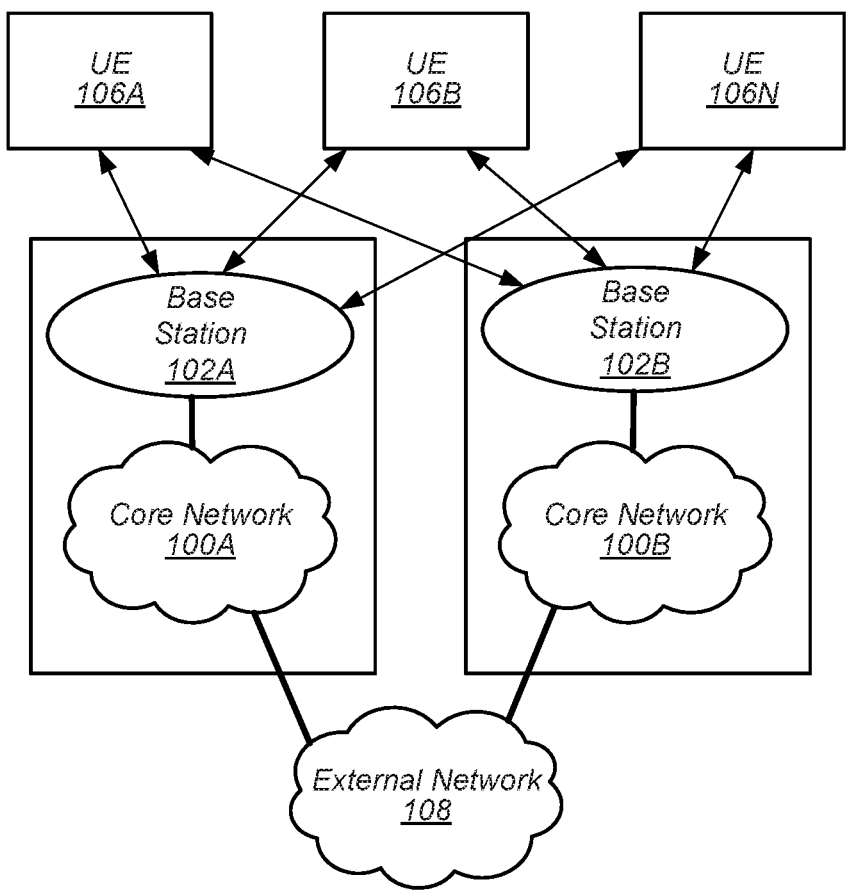
Figure 3:
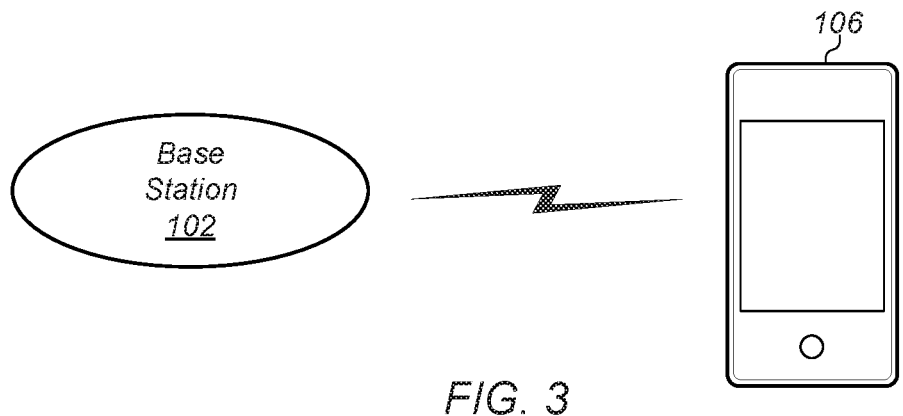
FIG. 3 illustrates an example of a base station in communication with a user equipment device, according to some embodiments.

FIGS. 1-3—Communication System

FIGS. 1 and 2 illustrate exemplary (and simplified) wireless communication systems. It is noted that the systems of FIGS. 1 and 2 are merely examples of certain possible systems, and various embodiments may be implemented in any of various ways, as desired.

The wireless communication system of FIG. 1 includes a base station 102A which communicates over a transmission medium with one or more user equipment (UE) devices 106A, 106B, etc., through 106N. Each of the user equipment devices may be referred to herein as "user equipment" (UE). In the wireless communication system of FIG. 2, in addition to the base station 102A, base station 102B also communicates (e.g., simultaneously or concurrently) over a transmission medium with the UE devices 106A, 106B, etc., through 106N.

The base stations 102A and 102B may be base transceiver stations (BTSs) or cell sites, and may include hardware that enables wireless communication with the user devices 106A through 106N. Each base station 102 may also be equipped to communicate with a core network 100 (e.g., base station 102A may be coupled to core network 100A, while base station 102B may be coupled to core network 100B), which may be a core network of a cellular service provider. Each core network 100 may be coupled to one or more external networks (such as external network 108), which may include the Internet, a Public Switched Telephone Network (PSTN), or any other network. Thus, the base station 102A may facilitate communication between the user devices and/or between the user devices and the network 100A; in the system of FIG. 2, the base station 102B may facilitate communication between the user devices and/or between the user devices and the network 100B.

The base stations 102A and 102B and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc.

For example, base station 102A and core network 100A may operate according to a first cellular communication standard (e.g., LTE) while base station 102B and core network 100B operate according to a second (e.g., different) cellular communication standard (e.g., GSM, UMTS, and/or one or more CDMA2000 cellular communication standards). The two networks may be controlled by the same network operator (e.g., cellular service provider or "carrier"), or by different network operators. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the network configuration shown in FIG. 2, other network configurations implementing multiple cellular communication technologies are also possible. As one example, base stations 102A and 102B might operate according to different cellular communication standards but couple to the same core network. As another example, multi-mode base stations capable of simultaneously supporting different cellular communication technologies (e.g., LTE and CDMA 1×RTT, GSM and UMTS, or any other combination of cellular communication technologies) might be coupled to a core network that also supports the different cellular communication technologies. Any of various other network deployment scenarios are also possible.

As a further possibility, it is also possible that base station 102A and base station 102B may operate according to the same wireless communication technology (or an overlapping set of wireless communication technologies). For example, base station 102A and core network 100A may be operated by one cellular service provider independently of base station 102B and core network 100B, which may be operated by a different (e.g., competing) cellular service provider. Thus in this case, despite utilizing similar and possibly compatible cellular communication technologies, the UE devices 106A-106N might communicate with the base stations 102A-102B independently, possibly by utilizing separate subscriber identities to communicate with different carriers' networks.

A UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). As another example, a UE 106 might be configured to communicate using different 3GPP cellular communication standards (such as two or more of GSM, UMTS, LTE, or LTE-A). Thus, as noted above, a UE 106 might be configured to communicate with base station 102A (and/or other base stations) according to a first cellular communication standard (e.g., LTE) and might also be configured to communicate with base station 102B (and/or other base stations) according to a second cellular communication standard (e.g., one or more CDMA2000 cellular communication standards, UMTS, GSM, etc.).

Base stations 102A and 102B and other base stations operating according to the same or different cellular communication standards may thus be provided as one or more networks of cells, which may provide continuous or nearly continuous overlapping service to UEs 106A-106N and similar devices over a wide geographic area via one or more cellular communication standards.

A UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 3 illustrates user equipment 106 (e.g., one of the devices 106A through 106N) in communication with a base station 102 (e.g., one of the base stations 102A or 102B). The UE 106 may be a device with wireless network connectivity such as a mobile phone, a hand-held device, a computer or a tablet, a wearable device or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of GSM, UMTS (W-CDMA, TD-SCDMA, etc.), CDMA2000 (1×RTT, 1×EV-DO, HRPD, eHRPD, etc.), LTE, LTE-A, WLAN, or GNSS. Other combinations of wireless communication standards are also possible.

The UE 106 may include one or more antennas for communicating using one or more wireless communication protocols. Within the UE 106, one or more parts of a receive and/or transmit chain may be shared between multiple wireless communication standards; for example, the UE 106 might be configured to communicate using either (or both) of GSM or LTE using a single shared radio. The shared radio may include a single antenna, or may include multiple antennas (e.g., for MIMO or beamforming) for performing wireless communications. MIMO is an acronym for Multi-Input Multiple-Output.

Figure 4:
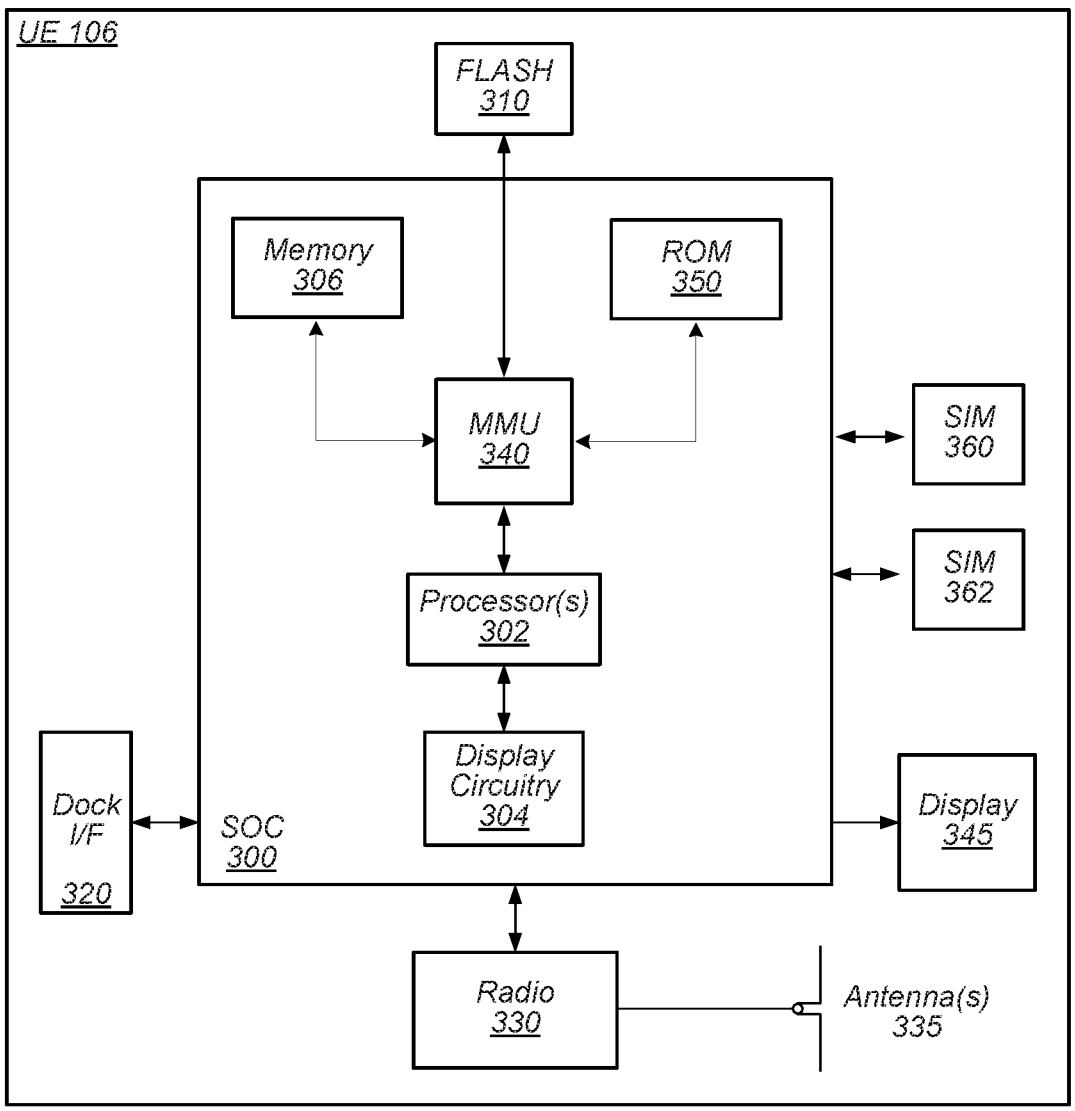
FIG. 4 illustrates an example of a block diagram of a user equipment device, according to some embodiments.

FIG. 4—Example of Block Diagram of a UE

FIG. 4 illustrates an example of a block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including Flash memory 310), a connector interface 320 (e.g., for coupling to a computer system, dock, charging station, etc.), the display 345, and radio 330.

The radio 330 may include one or more RF chains. Each RF chain may include a transmit chain, a receive chain, or both. For example, radio 330 may include two RF chains to support dual connectivity with two base stations (or two cells). The radio may be configured to support wireless communication according to one or more wireless communication standards, e.g., one or more of GSM, UMTS, LTE, LTE-A, WCDMA, CDMA2000, Bluetooth, Wi-Fi, GPS, etc.

The radio 330 couples to antenna subsystem 335, which includes one or more antennas. For example, the antenna subsystem 335 may include a plurality of antennas to support applications such as dual connectivity or MIMO or beamforming. The antenna subsystem 335 transmits and receives radio signals to/from one or more base stations or devices through the radio propagation medium, which is typically the atmosphere.

In some embodiments, the processor(s) 302 may include a baseband processor to generate uplink baseband signals and/or to process downlink baseband signals. The processor(s) 302 may be configured to perform data processing according to one or more wireless telecommunication standards, e.g., one or more of GSM, UMTS, LTE, LTE-A, WCDMA, CDMA2000, Bluetooth, Wi-Fi, GPS, etc.

The UE 106 may also include one or more user interface elements. The user interface elements may include any of various elements, such as display 345 (which may be a touchscreen display), a keyboard (which may be a discrete keyboard or may be implemented as part of a touchscreen display), a mouse, a microphone and/or speakers, one or more cameras, one or more sensors, one or more buttons, sliders, and/or dials, and/or any of various other elements capable of providing information to a user and/or receiving/interpreting user input.

As shown, the UE 106 may also include two or more subscriber identity modules (SIMs) such as SIM 360 and SIM 362. One or both of SIMs 360 and 362 may be implemented as an embedded SIM (eSIM). In this case, SIM 360 and/or SIM 362 may be implemented in device hardware and/or software. For example, in some embodiments, the UE 106 may include an embedded UICC (eUICC), e.g., a device which is built into the UE 106 and is not removable. The eUICC may be programmable, such that one or more eSIMs may be implemented on the eUICC. In other embodiments, the eSIM may be installed in UE 106 software, e.g., as program instructions stored on a memory medium (such as memory 306 or Flash 310) executing on a processor (such as processor 302) in the UE 106. As one example, a SIM 360 may be an application which executes on a Universal Integrated Circuit Card (UICC). Alternatively, or in addition, one or both of SIMs 360 and 362 may be implemented as removeable SIM cards.

Each SIM 360 or 362 may include a number of types of information, including personalized information specific to a user and/or device (e.g., personalized information), and information that is not specific to a user and/or device (e.g., common information). The personalized information may include user/unit specific data, for example information identifying the user/unit to their carrier's network, personalized authorization and/or security information, etc. Some or all of the personalized information may be used as a subscriber identity for the UE 106, for example in order to identify the subscriber to a carrier's network and to obtain cellular service from the carrier.

As one example, the personalized information may include one or more International Mobile Subscriber Identity (IMSI) numbers. An IMSI may identify the subscriber to their carrier's network. The IMSI may, for example, be a number including the subscriber's "home" mobile country code (MCC) and mobile network code (MNC), as well as a Mobile Subscription Identification Number (MSIN) which is unique to the subscriber. The personalized information may also or alternatively include a personal identification number (PIN) (e.g., a code which the user may use to access their SIM), a personal unblocking code and/or personal unblocking key (PUC/PUK), and one or more authentication keys (K/Ki). Any of a variety of other personalized information may also or alternatively be used, as desired.

Thus, each SIM 360 and 362 may contain subscriber identity information that may be used to identify the subscriber to its carrier cellular network. As noted above, the UE 106 may utilize multiple subscriber identities. For example, a user may consider it desirable to obtain service from multiple carriers for any of a variety of reasons, including differing footprints/service areas of different carriers, different service plans/pricing offered by different carriers, or different technologies used. In some cases it may be desirable to utilize multiple subscriber identities (whether from the same or different carriers) as a means of differentiating types of interactions, such as work-related communications and personal communications. For example, one SIM may be used to provide a work phone number while the other SIM may be used to provide a personal phone number.

As a further possibility, a situation might arise in which it might be desirable to utilize multiple subscriber identities in a single device for some carriers which implement LTE networks. In particular, in some cases an LTE network may be at least initially deployed for packet-switched data communications (e.g., web browsing, email and other networking applications, etc.), while a pre-existing GSM and/or UMTS network may be utilized for circuit-switched communication technologies such as voice communications.

As further described below, the UE 106 may implement various techniques which enable the UE to improve performance when one of the SIMs is a connected state while another one of the SIMs in an idle state. Accordingly, as described further subsequently herein, the UE 106 may include hardware and software components for implementing such techniques.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as or include: a programmable hardware element, such as an FPGA (Field Programmable Gate Array); or an ASIC (Application Specific Integrated Circuit); or a combination thereof.

Figure 5:
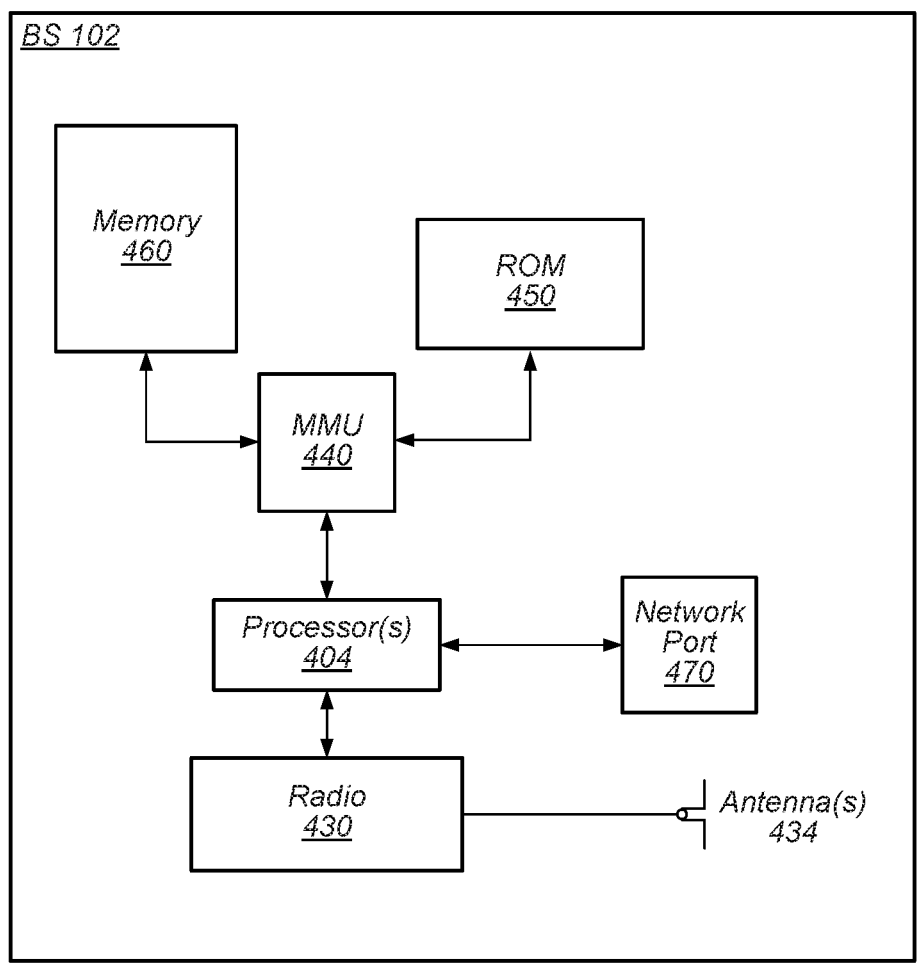
FIG. 5 illustrates an example of a block diagram of a base station, according to some embodiments.

FIG. 5—Example of a Base Station

FIG. 5 illustrates a block diagram of a base station 102. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory ROM 450) or to other circuits or devices.

The base station 102 may include at least one network port 470. The network port 470 may be configured to couple to a telephone network and provide access (for a plurality of devices, such as UE devices 106) to the telephone network, as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430 having one or more RF chains. Each RF chain may include a transmit chain, a receive chain, or both. (For example, the base station 102 may include at least one RF chain per sector or cell.) The radio 430 couples to antenna subsystem 434, which includes one or more antennas. Multiple antennas would be needed, e.g., to support applications such as MIMO or beamforming. The antenna subsystem 434 transmits and receives radio signals to/from UEs through the radio propagation medium (typically the atmosphere).

In some embodiments, the processor(s) 404 may include a baseband processor to generate downlink baseband signals and/or to process uplink baseband signals. The baseband processor may be configured to operate according to one or more wireless telecommunication standards, including, but not limited to: GSM, LTE, WCDMA, CDMA2000, etc.

The processor(s) 404 of the base station 102 may be configured to implement part or all of the methods described herein, e.g., by executing program instructions stored on a memory medium (e.g., a non-transitory computer-readable memory medium). In some embodiments, the processor(s) 404 may include: a programmable hardware element, such as an FPGA (Field Programmable Gate Array); or an ASIC (Application Specific Integrated Circuit); or a combination thereof.

Improved Throughput and Radio Resource Utilization for User Equipment Having a Plurality of SIMs Various mechanisms are herein disclosed for improving throughput and/or radio resource utilization for user equipment (UE) having a plurality of SIMs and for networks that communicate with such user equipment.

In some embodiments, the UE is a Dual SIM Dual Active (DSDA) device. A DSDA device has two SIMs, and more than one transceiver (i.e., more than one RF TxRx chain). Both SIMs are able to communicate simultaneously, with each SIM being mapped to an independent RF TxRx chain. In protocol terms, both SIMs can be in (RRC) Connected mode at same time. Thus, there may be no need to time share an RF TxRx chain between the two SIMs.

In some embodiments, the UE is a Dual SIM Dual Standby (DSDS) device. A DSDS device is a device in which there can be only one SIM in Connected mode at any given time. If one of the SIMs is in Connected mode, the other must be in an IDLE (or standby) state. A DSDS device typically has a single transmitter and a single receiver. Such a DSDS device may be referred to as a Single-Receive DSDS (SR-DSDS) device. Since an SR-DSDS device has a single transmitter, both SIMs cannot transmit simultaneously, and hence, both SIMs cannot be in Connected mode simultaneously. In IDLE mode, both SIMs can monitor the pages since they can time share the single receiver. When one of the SIMs enters Connected mode, the other SIM can still receive its pages and remain in service, as long as it's possible to timeshare the receiver with the Connected-mode SIM. Timesharing the receiver is usually possible when the Connected mode SIM is in data call. But is it is not possible if the Connected-mode SIM is in a voice call since there is no opportunity to timeshare the single receiver. Thus, the other SIM (in IDLE Mode) enters a "no service" state when the Connected-mode SIM is in a voice call.

In some embodiments, the UE is a Dual-Receiver Dual SIM Dual Standby (DR-DSDS) device. A DR-DSDS device is a device in which there are two receivers but only one transmitter. Thus, each SIM may be mapped to a corresponding receiver, and both SIMs can receive pages in parallel, and perform IDLE-mode measurements in parallel (for mobility purposes). When one of the SIMs enters the connected mode, the other SIM can still monitor its pages since there is a dedicated receiver allocated to it, and this is true regardless of the call type (data call vs. voice call) of the Connected-mode SIM. One difference between SR-DSDS and DR-DSDS devices is that, for the DR-DSDS device, when one SIM is in Connected mode, the other SIM may remain in service all the time, regardless of the call type on the Connected-mode SIM. For the SR-DSDS device, when one of the SIMs is in Connected mode, the other SIM (which is in IDLE mode) enters a "no service" state if the Connected-mode SIM is in a voice call.

Figure 6:
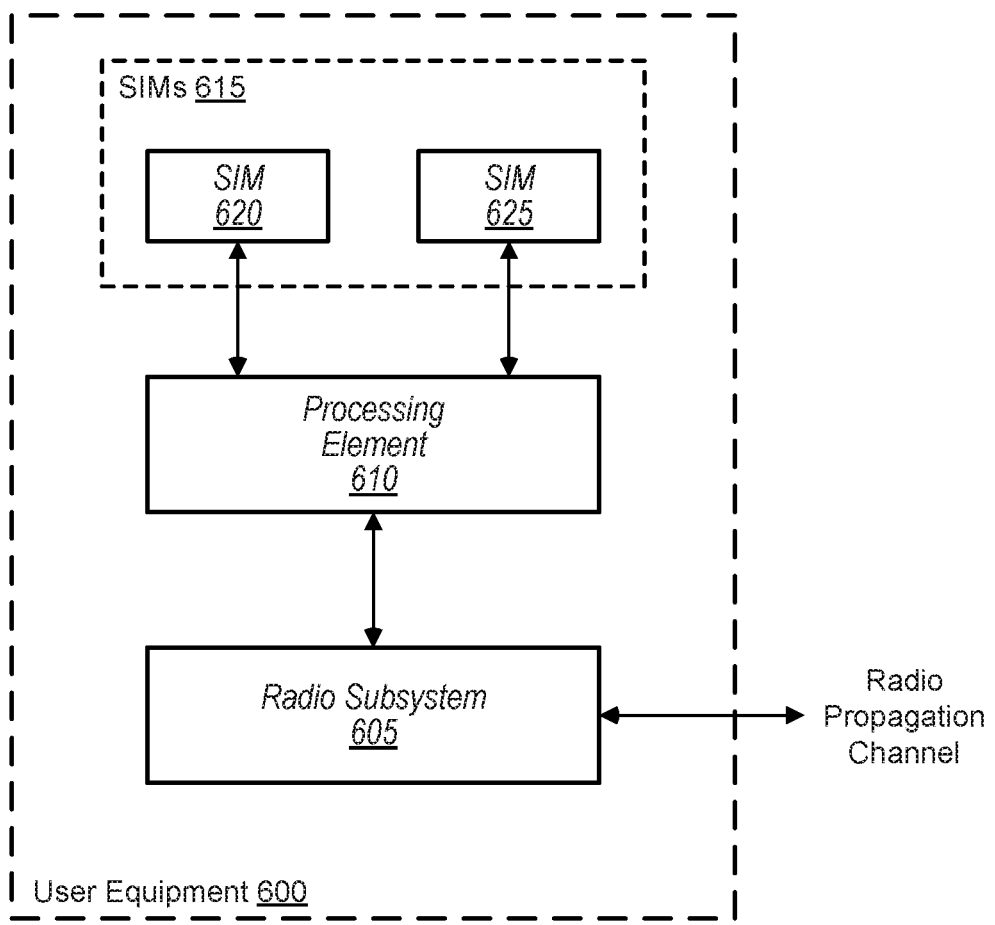
FIG. 6 illustrates a user equipment 600 according to one set of embodiments, where the user equipment 600 include a plurality of subscriber identity modules (SIMs), according to some embodiments.

In some embodiments, a wireless user equipment (UE) device 600 may be configured as shown in FIG. 6. UE 600 may include: a radio subsystem 605 for performing wireless communication; a processing element 610 operatively coupled to the radio subsystem; and a plurality 615 of subscriber identity modules (SIMs). (UE 600 may also include any subset of the UE features described above, e.g., in connection with FIGS. 1-4.)

The radio subsystem 605 may include one or more RF chains, e.g., as variously described above. Each RF chain may be configured to receive signals from the radio propagation channel and/or transmit signals onto the radio propagation channel. Thus, each RF chain may include a transmit chain and/or a receive chain. The radio subsystem 605 may be coupled to one or more antennas (or arrays of antennas) to facilitate the signal transmission and reception. Each RF chain (or, some of the RF chains) may be tunable to a desired frequency, thus allowing the RF chain to receive or transmit at different frequencies at different times.

The processing element 610 may be coupled to the radio subsystem and to the plurality of SIMs, and may be configured as variously described above. (For example, processing element may be realized by processor(s) 302.) In some embodiments, the processing element may include one or more baseband processors to (a) generate baseband signals to be transmitted by the radio subsystem and/or (b) process baseband signals provided by the radio subsystem.

The plurality 615 of SIMs may include a first SIM 620 and a second SIM 625. Each of the SIMs supports access to a corresponding wireless network. In other words, each SIM may be subscribed to a corresponding carrier. Each SIM may have a corresponding assigned mobile phone number. The carrier associated with the first SIM may be the same as or different from the carrier associated with the second SIM.

The processing element 610 may be further configured as variously described in the sections below.

Figure 7:
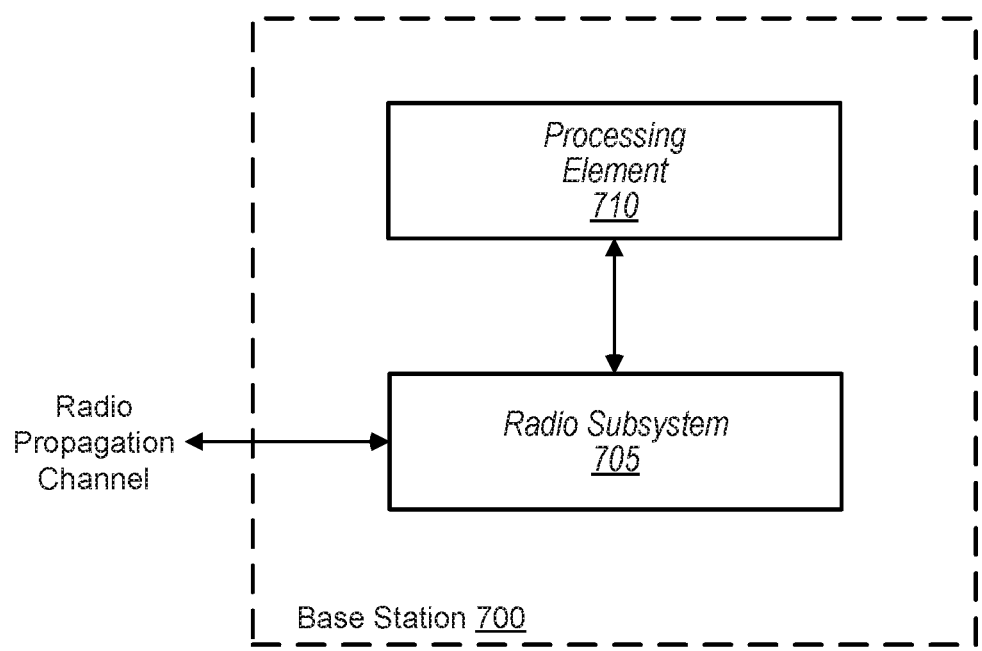
FIG. 7 illustrates a base station 700 according to some embodiments. The base station 700 may be used to communicate with user equipment 600 of FIG. 6.

In some embodiments, a wireless base station 700 of a first wireless network (not shown) may be configured as shown in FIG. 7. The wireless base station may include: a radio subsystem 705 for performing wireless communication; and a processing element 710 operatively coupled to the radio subsystem. (The wireless base station may also include any subset of the base station features described above, e.g., the features described above in connection with FIG. 5.)

The radio subsystem 705 may include one or more RF chains. Each RF chain may be tunable to a desired frequency, thus allowing the RF chain to receive or transmit at different frequencies at different times.

The processing element 710 may be realized as variously described above. For example, in one embodiment, processing element 710 may be realized by processor(s) 404. In some embodiments, the processing element may include one or more baseband processors to: (a) generate baseband signals to be transmitted by the radio subsystem, and/or, (b) process baseband signals provided by the radio subsystem.

In some embodiments, the NW may be aware of the traffic pattern and serving frequencies of the SIMs in a multi-SIM UE, and provide coordinated configuration and/or scheduling for the multi-SIM UE. The SIMs may include at least a first SIM associated with the NW and a second SIM associated with another network.

In some embodiments, for the NW to be become aware of the traffic pattern and serving frequencies of one or more of the SIMs, the NW may receive the traffic pattern and/or serving frequencies via a UE NAS procedure. (NAS is an acronym for Non-Access Stratum.) The NW may establish an association between the SIMs, and record the association within the NW.

Alternatively, the UE may provide multi-SIM assistance information (such as traffic pattern and/or serving frequencies) to the NW, to allow the NW to perform coordinated configuration and/or scheduling. For example, the UE may provide time-domain information such as the traffic pattern of the potential activity of the second SIM, where the potential activity may include, e.g., paging reception, SIB reception, idle mode measurement. (SIB is an acronym for system information block.) As another example, the UE may provide frequency-domain information such as the serving frequency of the second SIM to the NW. As yet another example, the UE may simply provide to the NW an indication that the UE is a multi-SIM device, which may enable the NW to avoid wasted effort in the case that the UE does not follow the scheduling instructions of the NW due to the activity of the second SIM.

In some embodiments, in order to provide coordinated configuration and/or scheduling for the multi-SIM UE, the NW may perform one or more of the following methods.

Method 1: The NW may provide the traffic pattern (e.g., DRX configuration) of the second SIM to the UE, and the UE may perform data reception and/or transmission for the first SIM based on the traffic pattern, e.g., as variously disclosed herein.

Method 2: The NW may reconfigure the UE to the serving cell with the frequency so that the UE's RF hardware is capable of performing simultaneous data transfers (transmission/reception) for both SIMs.

Method 3: The NW may configure the UE to perform autonomous denial with a denial probability, and the UE may autonomously deny the data transmission of the first SIM.

In some embodiments, the NW may provide coordinated configuration and/or scheduling for a multi-SIM UE operating in a dual connectivity mode, e.g., in a Multi-RAT Dual Connectivity (MR-DC) mode or a non-DC mode. For the MR-DC mode, the coordination may be CG (Cell Group) specific, i.e., the coordination may be SCG or MCG specific, and the UE assistance information may also include the impacted CG information (MCG/SCG). (SCG is an acronym for Second Cell Group. MCG is an acronym for Master Cell Group.)

In some embodiments, the first SIM and the second SIM may be associated with the same carrier. In these embodiments, when the first SIM of the UE is in connected mode, and the paging of the second SIM is triggered by core network (CN), the NW may employ one or more of the following methods for handling the paging of the second SIM.

Method 1: The NW may deliver the paging for the second SIM in a legacy fashion. The UE may perform paging reception for the second SIM.

Method 2: The NW may deliver the paging for the second SIM via the connection with the first SIM, e.g., in an RRC signaling container for the first SIM, or in a new L2 PDU for the paging indication including the information of the second SIM. (PDU is an acronym for Protocol Data Unit.)

Method 3: The NW may suspend the paging of the second SIM, and deliver the paging after the first SIM's connection is completed. Paging for the second SIM may be cached by the NW for certain time duration. While a timer is running, the caller may be informed that call establishment is being attempted while callee is busy; thereafter, if the timer expires before the call can be established, the caller may be informed that the callee is busy and the call cannot be established.

Method 4: The NW may suspend the second SIM's paging, and reply "user busy" directly to the caller.

Reduction of Page Monitoring Impact to Connected Mode Performance

Suppose that SIM-1 transitions to connected mode while SIM-2 is in idle mode and performing page monitoring according to a configured DRX cycle. When SIM-1 transitions to the connected mode, a session of data transfer begins, e.g., a high throughput data transfer session. However, a UE suspends SIM-1 every DRX cycle to monitor the paging opportunities (or paging occasions) for SIM-2 as well as perform serving cell measurements, and depending on the channel conditions, measurement(s) of intrafrequency, inter-frequency or inter-RAT neighbors, which could take as much as 5 to 10 ms. During this time, a NW will continue to send DL data and also provide UL grants to the UE which will not be utilized by the UE. This results in HARQ retransmissions and radio resource wastage on the NW side. Moreover, the NW side will receive no response (UL or ACK) during the tune away, which causes MCS reduction or context release (e.g., call drop).

Figure 8A:
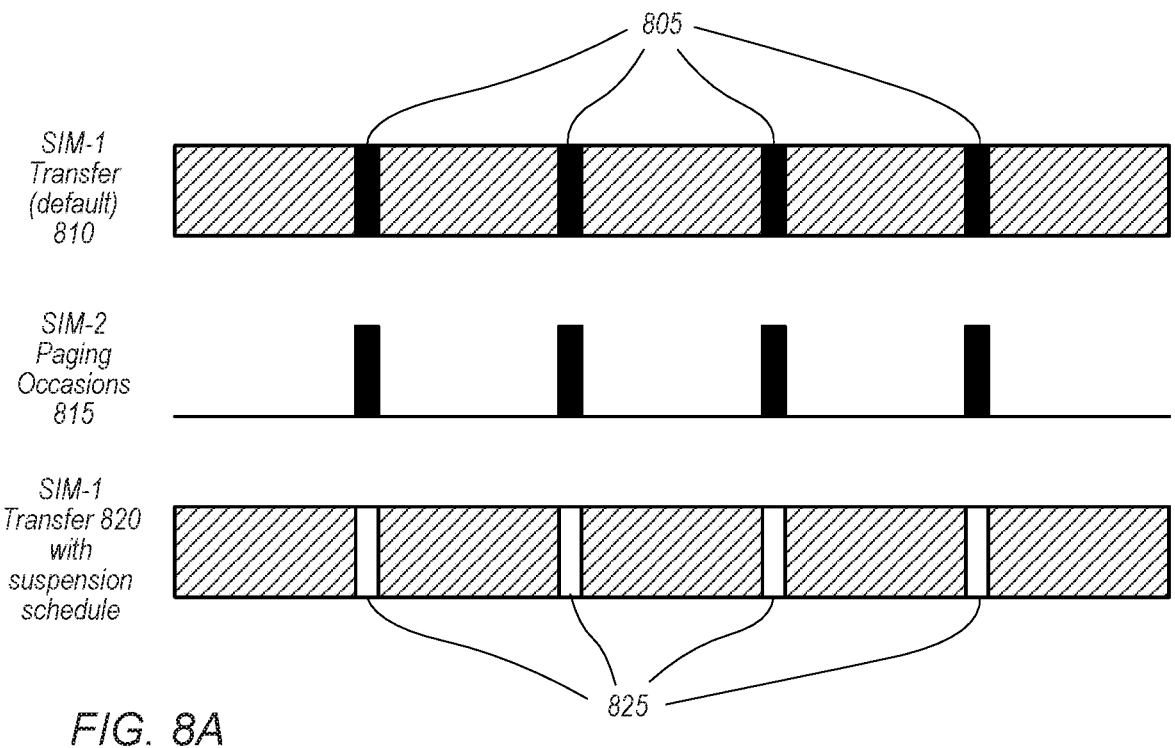
FIG. 8A illustrates one embodiment of a default transfer 810 for a first subscriber identity module (SIM) of a user equipment device, a series of paging occasions 815 for a second SIM of the user equipment device, and a transfer 820 for the first SIM, with a suspension schedule, according to some embodiments.

FIG. 8A shows a default data transfer session 810 for SIM-1, which is periodically interrupted by momentary intervals of time (shown in solid black) where the RF chain under use is tuned away (to a different frequency if the carrier of SIM-2 is different from the carrier of SIM-1) by the UE in order to support the monitoring of paging occasions 815 for SIM-2. (Data transfers of the session 810 would occur in the crosshatched regions.) As shown at 805, any uplink grants for SIM-1 during the momentary intervals would be wasted, and any downlink data transferred for SIM-1 during the momentary intervals would be wasted, since SIM-1 doesn't have control of the RF-chain during those periods of time.

In some embodiments, one may reduce the impact of page monitoring to connected mode performance by applying the following methodology.

The UE may notify the network (e.g., the network of SIM-1 and/or the network of SIM-2) of its multi-SIM capability during a registration procedure. SIM-1 may inform its carrier (denoted $Carrier_{SIM1}$) about SIM-2's paging schedule (e.g., by MAC-CE or a higher layer procedure). Using the paging schedule, $Carrier_{SIM1}$ stops scheduling data for SIM-1 during the above described momentary intervals of time, and also stops DL data transmissions for SIM-1 during those momentary intervals. In other words, $Carrier_{SIM1}$ provides for SIM-1's transfer session with a suspension schedule, as shown at 820 of FIG. 8A. Notice that the momentary intervals of time are now shown at 825 in white (instead of solid black), to indicate that they are no longer wasted periods of time.

This methodology may achieve certain benefits such as the following. $Carrier_{SIM1}$ can allocate UL grants to other UEs and DL data retransmissions to SIM-1 are avoided during these gaps, which saves network resources. Retransmissions may be reduced, and glitches in DL throughput may be reduced, with the consequence that user experience is improved.

Figure 8B:
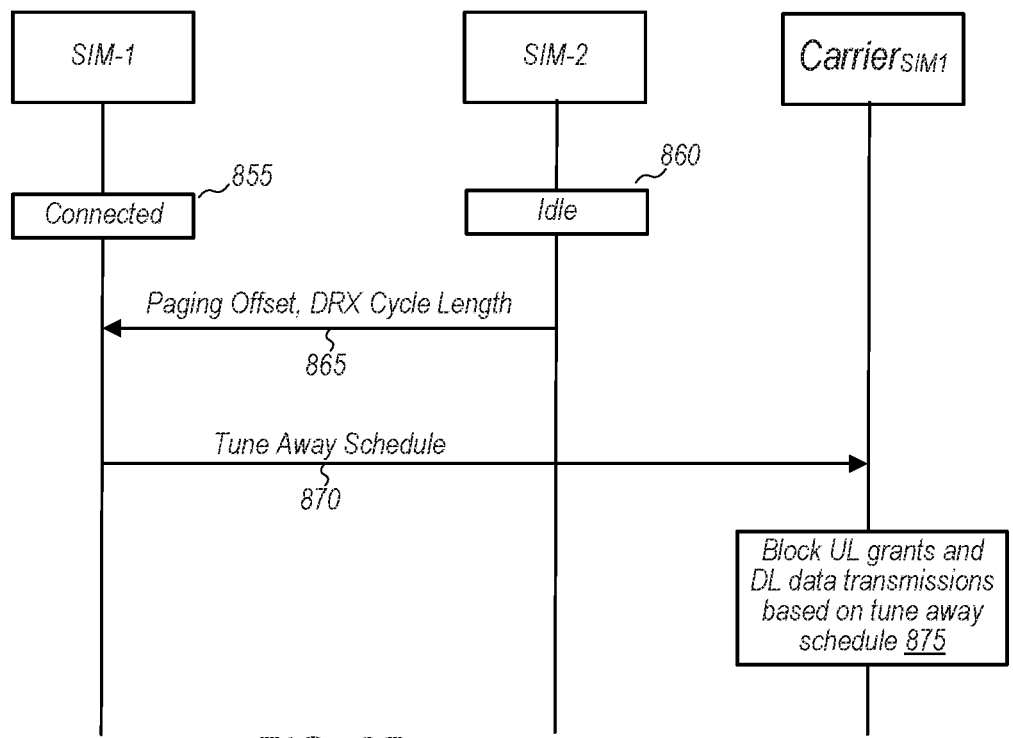
FIG. 8B illustrates one embodiment of a method for informing a carrier network, associated with a first SIM, of a tune-away schedule (or a paging schedule) of a second SIM, according to some embodiments.

In some embodiments, a method for reducing the impact of page monitoring to connected mode performance may be performed as shown in FIG. 8B. When SIM-1 is in connected mode 855 and SIM-2 is in idle mode 860, a paging offset and/or DRX cycle length may be supplied from SIM-2 to SIM-1, as shown at 865. SIM-1 may then direct the transmission 870 of a tune away schedule to the carrier network ($Carrier_{SIM1}$) associated with SIM-1, e.g., via a base station of $Carrier_{SIM1}$. The tune away schedule may include information indicating the paging offset and/or DRX cycle length. In response to receiving the tune away schedule, $Carrier_{SIM1}$ may block UL grants and DL data transmissions for SIM-1 based on the tune away schedule, as shown at 875.

Recall now the user equipment 600 of FIG. 6. In some embodiments, in response to determining that the first SIM 620 is entering or has entered a connected state and that the second SIM 625 is entering or has entered an idle state, the processing element 610 may be configured to direct the radio subsystem 605 to transmit page scheduling information to the wireless network corresponding to the first SIM. In an alternative embodiment, the processing element 610 may be configured to direct the radio subsystem 605 to transmit page scheduling information as part of a registration procedure that registers the UE device with the wireless network associated with the first SIM 620.

The page scheduling information may indicate a periodic sequence of temporal intervals used (or to be used) at least for monitoring pages from the wireless network corresponding to the second SIM. (The page scheduling information may also include a page offset.)

Furthermore, during the connected state of the first SIM 620 and the idle state of the second SIM 625, the processing element may be configured to control an RF chain of the radio subsystem 605 to support a data transfer process for the first SIM and page monitoring for the second SIM. The page monitoring may be performed only during the temporal intervals of the periodic sequence. In some embodiments, the data transfer process may have either an uplink direction or a downlink direction, and occur only outside the temporal intervals of the periodic sequence.

In the uplink direction, the data transfer process transmits data to a base station of the wireless network corresponding to the first SIM, using the RF chain. In particular, the processing element may provide a baseband signal carrying user data to the RF chain and direct the RF chain to transmit radio signals corresponding to the baseband signal. In the downlink direction, the data transfer process may receive data transmitted by the base station. In particular, the processing element may direct the RF chain to receive radio signals transmitted by the base station and to convert those radio signals into a baseband signal. The processing element may recover data from the baseband signal and provide the data to higher protocol layers of the UE.

In some embodiments, at least one of the temporal intervals is used for performing cell measurement on one or more cells of the wireless network of the second SIM. The processing element may report the measurement to the wireless network of the second SIM, e.g., during one of the temporal intervals.

In some embodiments, data transfers of the data transfer process are performed when the RF chain is tuned to a first frequency. For each of the temporal intervals, the page monitoring may include tuning the RF chain away from the first frequency to a second frequency during the temporal interval, e.g., at the start of the temporal interval.

In some embodiments, the page scheduling information may include a DRX cycle value. (DRX is an acronym for Discontinuous Reception.) In some embodiments, the page scheduling information includes a page offset. In some embodiments, the page scheduling information may include a duration of the temporal intervals. In some embodiments, the page scheduling information may include any combination of DRX cycle value, page offset, and duration of the temporal intervals.

In some embodiments, the wireless network corresponding to the first SIM and the wireless network corresponding to the second SIM belong to different carriers.

In some embodiments, at least one of the SIMs is an embedded SIM.

In some embodiments, a wireless user equipment (UE) device may include: a radio subsystem for performing wireless communication; a processing element operatively coupled to the radio subsystem; and a plurality of subscriber identity modules (SIMs). Each of the subscriber identity modules may support access to a corresponding wireless network. The processing element may be configured to: in response to determining that a first of the SIMs is entering or has entered a connected state and that a second of the SIMs is entering or has entered an idle state, direct the radio subsystem to transmit page scheduling information to the wireless network corresponding to the first SIM, wherein the page scheduling information indicates a periodic sequence of temporal intervals at least for monitoring pages from the wireless network corresponding to the second SIM; and during the connected state of the first SIM and the idle state of the second SIM, control an RF chain of the radio subsystem to support (a) a data transfer process for the first SIM and (b) page monitoring for the second SIM. The page monitoring may be performed only during the temporal intervals of the periodic sequence. The data transfer process may have either an uplink direction or a downlink direction, and occur only outside the temporal intervals of the periodic sequence.

In some embodiments, at least one of the temporal intervals is also used for performing a cell measurement on one or more cells of the wireless network of the second SIM.

In some embodiments, data transfers of the data transfer process are performed when the RF chain is tuned to a first frequency. For each of the temporal intervals, the action of page monitoring may include tuning the RF chain away from the first frequency to a second frequency, e.g., during the temporal interval.

In some embodiments, the page scheduling information includes a DRX cycle value. The DRX cycle value is the period between successive paging opportunities.

In some embodiments, the page scheduling information includes a page offset. The page offset is defined as an offset to a paging frame or a System Frame Number when paging frame is scheduled.

In some embodiments, the page scheduling information includes a duration of the temporal intervals.

In some embodiments, the page scheduling information may include any combination of: DRX cycle value; page offset; and duration of the temporal intervals.

In some embodiments, the wireless network corresponding to the first SIM and the wireless network corresponding to the second SIM belong to different carriers.

In some embodiments, at least one of the SIMs is an embedded SIM.

In some embodiments, a method 880 for operating a wireless user equipment (UE) device having a plurality of subscriber identity modules (SIMs) may be configured as shown in FIG. 8C. The method may be performed by a processing element of the UE device, e.g., as variously described above.

At 885, in response to determining that a first of the SIMs is entering or has entered a connected state and that a second of the SIMs is entering or has entered an idle state, the processing element may direct a radio subsystem of the wireless UE device to transmit page scheduling information to a wireless network corresponding to the first SIM. The page scheduling information may indicate a sequence (e.g., a periodic sequence) of temporal intervals at least for monitoring pages from a wireless network corresponding to the second SIM.

At 890, during the connected state of the first SIM and the idle state of the second SIM, the processing element may control an RF chain of the radio subsystem to support a data transfer process for the first SIM and page monitoring for the second SIM. The page monitoring may be performed only during the temporal intervals of the sequence. The data transfer process may have either an uplink direction or a downlink direction, and occur only outside the temporal intervals of the sequence.

In some embodiments, the page scheduling information may include a DRX cycle value. In some embodiments, the page scheduling information may include a page offset. In some embodiments, the page scheduling information may include a duration of the temporal intervals. In some embodiments, the page scheduling information may include any combination of the DRX cycle value, the page offset, and the duration of the temporal intervals.

In some embodiments, the wireless network corresponding to the first SIM and the wireless network corresponding to the second SIM belong to different carriers.

In some embodiments, a method for operating a wireless user equipment (UE) device having a plurality of subscriber identity modules (SIMs) may be performed as follows. In response to determining that a first of the SIMs is entering or has entered a connected state and that a second of the SIMs is entering or has entered an idle state, a processing element of the wireless UE device may direct a radio subsystem of the wireless UE device to transmit page scheduling information to a wireless network corresponding to the first SIM. The page scheduling information may indicate a sequence (e.g., a periodic sequence) of temporal intervals at least for monitoring pages from a wireless network corresponding to the second SIM. During the connected state of the first SIM and the idle state of the second SIM, the processing element may control an RF chain of the radio subsystem to support (e.g., conduct) a data transfer process for the first SIM and page monitoring for the second SIM. The page monitoring may be performed during (e.g., only during) the temporal intervals of the sequence. The data transfer process may have either an uplink direction or a downlink direction, and occur only outside the temporal intervals of the sequence.

In some embodiments, the page scheduling information includes a DRX cycle value. In some embodiments, the page scheduling information includes a page offset. In some embodiments, the page scheduling information includes a duration of the temporal intervals. In some embodiments, the page scheduling information may include any combination of the DRX cycle value, the page offset, and the duration of the temporal intervals.

In some embodiments, the wireless network corresponding to the first SIM and the wireless network corresponding to the second SIM belong to different carriers.

Recall now the base station 700 of FIG. 7. The base station may be associated with (e.g., belong to) a first wireless network (not shown). In some embodiments, the processing element 710 may be configured to receive page scheduling information from a user equipment (UE) device. (The UE device may transmit the page scheduling information in response to determining that a first SIM of the UE device is entering or has entered a connected state and that a second SIM of the UE device is entering or has entered an idle state.) The page scheduling information may indicate a sequence (e.g., a periodic sequence) of temporal intervals associated with paging opportunities (or paging occasions) of a second wireless network different from the first wireless network. In response to receiving the page scheduling information, the processing element 710 may be further configured to control an RF chain of the radio subsystem 705 to support a data transfer process associated with the UE device, e.g., associated with the first SIM of the UE device. The data transfer process may have either an uplink direction or a downlink direction. The data transfers of the data transfer process may be scheduled only outside the sequence of temporal intervals. The second wireless network may page the UE device (or the second SIM of the UE device) during one or more of the temporal intervals.

In some embodiments, the page scheduling information may include a Discontinuous Reception (DRX) cycle value. In some embodiments, the page scheduling information may include a page offset. In some embodiments, the page scheduling information may include a duration of the temporal intervals. In some embodiments, the page scheduling information may include any combination of DRX cycle value, page offset, and duration of the temporal intervals.

In some embodiments, the processing element 710 may be further configured to schedule uplink resources for a second UE device within one or more of the temporal intervals of the sequence.

In some embodiments, the base station 700 may also include an antenna subsystem including one or more antennas operatively coupled to the radio subsystem. The antenna subsystem may facilitate the transmission and/or reception of radio signals onto/from the radio propagation medium.

In some embodiments, the base station 700 may be configured as a master node or a secondary node of a dual connectivity connection with the UE device, e.g., as variously described above and below.

In some embodiments, a wireless base station of a first wireless network may include: a radio subsystem for performing wireless communication; and a processing element operatively coupled to the radio subsystem, where the processing element is configured to: receive page scheduling information from a user equipment (UE) device, wherein the page scheduling information indicates a sequence (e.g., a periodic sequence) of temporal intervals associated with paging opportunities (or paging occasions) of a second wireless network different from the first wireless network; and in response to receiving the page scheduling information, control an RF chain of the radio subsystem to support a data transfer process associated with the UE device. The data transfer process may have either an uplink direction or a downlink direction. Furthermore, data transfers of the data transfer process may be scheduled only outside the sequence of temporal intervals.

In some embodiments, the page scheduling information includes a Discontinuous Reception (DRX) cycle value. In some embodiments, the page scheduling information includes a page offset. In some embodiments, the page scheduling information also includes a duration of the temporal intervals. In some embodiments, the page scheduling information may include any combination of DRX cycle value, page offset, and duration of the temporal intervals.

In some embodiments, the processing element is further configured to schedule uplink resources to a second UE device within one or more of the temporal intervals of the sequence.

In some embodiments, the base station also includes an antenna subsystem including one or more antenna operatively coupled to the radio subsystem.

In some embodiments, the wireless base station may be configured as a master node or a secondary node of a dual connectivity connection with the UE device.

Dual Connectivity Handling for Dual SIM

Suppose that SIM-1 is in connected mode in an EN-DC (E-UTRA-NR Dual Connectivity) or an NR DC (New Radio Dual Connectivity) configuration. Further suppose that SIM-2 is in IDLE mode, and monitoring paging occasions, and performing measurements as per the configured DRX cycle. If RF that has been mapped to the NR leg is tuned away from SIM-1 to SIM-2 during paging occasions, then this tuning away may lead to beam failure on the SCG (secondary cell group), NR leg. This will lead to degradation of throughput on the NR leg.

In some embodiments, one may improve UE and network performance by applying the following methodology.

Both the master node and the secondary node may be informed in advance about SIM-2's DRX cycle and interruption time. (The master node hosts the MCG while the secondary node hosts the SCG. In the case where SIM-1 is in EN-DC mode, the master node is an eNB and the secondary node is a gNB. In the case where SIM-1 is in NR-DC mode, the master node and secondary node are both gNBs.) In EN-DC mode, the UE may indicate to the gNB and eNB whether the NR leg or the LTE leg will be tuned away for page monitoring on SIM-2. In NR DC mode, the UE may indicate which of the two NR legs will be tuned away for page monitoring on SIM-2.

In the case of EN-DC, it may not be possible or desirable to tune away RF mapped to the NR leg for page monitoring on SIM-2, especially if it is on FR2. Instead, RF mapped to the LTE leg should be tuned away to SIM-2. Thus, the UE may inform the network that the NR leg of SIM-1 will not be tuned away, and the network can continue normally scheduling UL and DL transmission on the NR leg throughout the session.

If both RF chains need to be tuned away, e.g., due to implementation reasons (such as an RF restriction depending on SIM-1 and SIM-2 frequencies), then the UE may inform the network that both RF frequencies (i.e., RF frequencies mapped to NR and LTE in case of EN-DC, or to NR and NR in case of NR DC) are tuned away, to allow the network to make efficient scheduling decisions.

In the case of EN-DC, if RF mapped to the NR leg has to be tuned away from its assigned frequency, then the UE may inform the eNB and gNB accordingly.

This methodology may achieve certain benefits, such as the following. The NW and the UE can make optimal scheduling decisions as the NW knows the UE's preference regarding which RF chain will be tuned away from the EN-DC (or NR DC) connection to monitor IDLE mode paging of the other SIM.

Recall now the wireless UE device 600 of FIG. 6. In some embodiments, the processing element 610 may be configured to direct the radio subsystem 605 to transmit page scheduling information to first and second base stations (not shown) of a first wireless network corresponding to the first SIM 620. The page scheduling information may indicate a sequence (e.g., a periodic sequence) of temporal intervals for monitoring pages of a second wireless network corresponding to the second SIM 625.

In some embodiments, in a dual connectivity (DC) state of the first SIM 620 and an idle state of the second SIM 625, the processing element 610 may be further configured to control a first RF chain of the radio subsystem to support (a) a first data transfer process for the first SIM 620 and (b) page monitoring for the second SIM 620. The first data transfer process may have either an uplink direction or a downlink direction.

Data transfers of the first data transfer process may occur outside (e.g., only outside) the temporal intervals of the sequence. (This temporal constraint on the first data transfer process may be a consequence of the fact that processing element 610 performs data transfers of the first data transfer process according to scheduling decisions made by the base station that is cooperating to facilitate the first data transfer process, and the fact that this base station has ceased to schedule uplink and/or downlink resources for the first data transfer process within the temporal intervals in response to having received to the page scheduling information.) The page monitoring for the second SIM may be performed during (e.g., only during) the temporal intervals of the sequence.

In some embodiments, the processing element 610 may be further configured to direct the radio subsystem 605 to transmit a selection indicator to the first and second base stations prior to said page monitoring for the second SIM. The selection indicator indicates a selected one of the first and second base stations that is to be in communication with the first RF chain during said controlling the first RF chain to support the data transfer process and the page monitoring. For example, the selected base station may control the data transfer process, and as part of said controlling, may avoid the scheduling of downlink transmissions and/or uplink grants for the UE during the temporal intervals.

In some embodiments, in the DC state of the first SIM 620 and the idle state of the second SIM 625, the processing element 610 may be further configured to control a second RF chain of the radio subsystem 605 to support a second data transfer process for the first SIM 620. (The second data transfer process may have the same or opposite transfer direction as the first data transfer process.) In contrast with the first data transfer process, the second data transfer process may not be affected by page monitoring for the idle mode SIM, e.g., as shown at 916 of FIG. 9.

In some embodiments, in the DC state of the first SIM 620 and the idle state of the second SIM 625, the processing element 610 may be further configured to control a second RF chain of the radio subsystem 605 to support a second data transfer process for the first SIM 620 and said page monitoring for the second SIM 625. (The second data transfer process may have the same or opposite transfer direction as the first data transfer process.) The data transfers of the second data transfer process may occur outside (e.g., only outside) the temporal intervals of the sequence, e.g., as illustrated by the temporal intervals 1014 of FIG. 10.

In some embodiments, the processing element 610 may be further configured to direct the radio subsystem to transmit a selection indicator to the first and second base stations, where the selection indicator indicates that both the first and second RF chains are subjected (or, to be subjected) to page monitoring.

The first and second base stations may conform to the same or different radio access technologies. For example, one of the base stations may be an LTE eNodeB and other base station may be a gNB of 5G NR. As another example, both base stations may be gNBs of 5G NR.

In some embodiments, the page scheduling information may include a Discontinuous Reception (DRX) cycle and/or an interruption time, where the interruption time indicates a temporal length of each of said temporal intervals.

In some embodiments, the action of directing the radio subsystem to transmit the selection indicator may be performed in response to determining that the first SIM 620 is entering or has entered a dual connectivity (DC) state and that the second SIM 625 is entering or has entered an idle state.

In some embodiments, a wireless user equipment (UE) device may include: a radio subsystem for performing wireless communication; a processing element operatively coupled to the radio subsystem; and a plurality of subscriber identity modules (SIMs), where each of the subscriber identity modules supports access to a corresponding wireless network. The processing element may be configured to direct the radio subsystem to transmit page scheduling information to first and second base stations of a first wireless network corresponding to a first of the SIMs. The page scheduling information may indicate a sequence (e.g., a periodic sequence) of temporal intervals for monitoring pages of a second wireless network corresponding to a second of the SIMs. In other words, the page scheduling information may indicate a sequence of temporal intervals to be used by the second SIM to monitor paging occasions (opportunities) of the second wireless network. (A base station of the second wireless network may transmit a page for the UE device during one or more of the temporal intervals.)

In some embodiments, the processing element may be further configured to: in the dual connectivity (DC) state of the first SIM and an idle state of the second SIM, control a first RF chain of the radio subsystem to support (a) a first data transfer process for the first SIM and (b) page monitoring for the second SIM. The first data transfer process may have either an uplink direction or a downlink direction. Data transfers of the first data transfer process may occur only outside the temporal intervals of the sequence. The page monitoring for the second SIM may be performed during (e.g., only during) the temporal intervals of the sequence.

In some embodiments, the processing element may be further configured to direct the radio subsystem to transmit a selection indicator to the first and second base stations prior to said page monitoring for the second SIM. The selection indicator may indicate a selected one of the first and second base stations that is to be in communication with the first RF chain during said controlling the first RF chain to support the first data transfer process and the page monitoring. (For example, the selected base station may support the first data transfer process as a leg of the dual connectivity of the UE device with the first wireless network.)

In some embodiments, the processing element may be further configured to: in the DC state of the first SIM and the idle state of the second SIM, control a second RF chain of the radio subsystem to support a second data transfer process for the first SIM and said page monitoring for the second SIM, wherein data transfers of the second data transfer process occur only outside the temporal intervals of the sequence.

In some embodiments, the processing element may be further configured to direct the radio subsystem to transmit a selection indicator to the first and second base stations, where the selection indicator indicates that both the first and second RF chains are subjected (or, to be subjected) to page monitoring. (For example, the first and second base stations may be support first and second legs of the dual connectivity of the UE device with the first wireless network.)

The first and second base stations may conform to the same or different radio access technologies.

In some embodiments, the page scheduling information includes a Discontinuous Reception (DRX) cycle and/or an interruption time, where the interruption time indicates a length of each of said temporal intervals.

In some embodiments, said directing the radio subsystem to transmit the selection indicator is performed in response to determining that the first SIM is entering or has entered a dual connectivity (DC) state and that the second SIM is entering or has entered an idle state.

Recall now the base station 700 of FIG. 7. In some embodiments, the processing element 710 may be configured to receive page scheduling information and a node indicator from a user equipment (UE) device. The UE device may include a plurality of SIMs, e.g., as variously described above. The page scheduling information may indicate a sequence (e.g., a periodic sequence) of temporal intervals associated with UE paging on an alien wireless network, i.e., a network different from the first wireless network. The node indicator may indicate a selected one of two dual connectivity nodes associated with the UE device.

In response to determining that the wireless base station is serving as the selected dual connectivity node, the processing element 710 may be further configured to perform (or direct) a data transfer process for the UE device. The data transfer process may have an uplink direction or a downlink direction. The data transfers of the data transfer process may be scheduled only outside the temporal intervals of the sequence.

In some embodiments, the two dual connectivity nodes include a master node belonging to a first radio access technology and a secondary node belonging to a second radio access technology, which is the same as or different from the first radio access technology.

In some embodiments, the processing element 710 may be further configured to schedule uplink and/or downlink resources for a second UE device during one or more of the temporal intervals.

In some embodiments, a wireless base station (for use in a first wireless network) may include: a radio subsystem for performing wireless communication; a processing element operatively coupled to the radio subsystem. The processing element may be configured to: (a) receive page scheduling information and a node indicator from a user equipment (UE) device, where the page scheduling information indicates a sequence (e.g., a periodic sequence) of temporal intervals associated with UE paging on an alien wireless network different from the first wireless network, where the node indicator indicates a selected one of two dual connectivity nodes associated with the UE device; and (b) in response to determining that the wireless base station is serving as the selected dual connectivity node, perform a data transfer process for the UE device. The data transfer process may have an uplink direction or a downlink direction. The data transfers of the data transfer process may be scheduled only outside the temporal intervals of the sequence.

In some embodiments, the two dual connectivity nodes include a master node belonging to a first radio access technology and a secondary node belonging to a second radio access technology, which is the same as or different from the first radio access technology.

In some embodiments, the processing element is further configured to schedule uplink and/or downlink resources for a second UE device during one or more of the temporal intervals.

Figure 9:
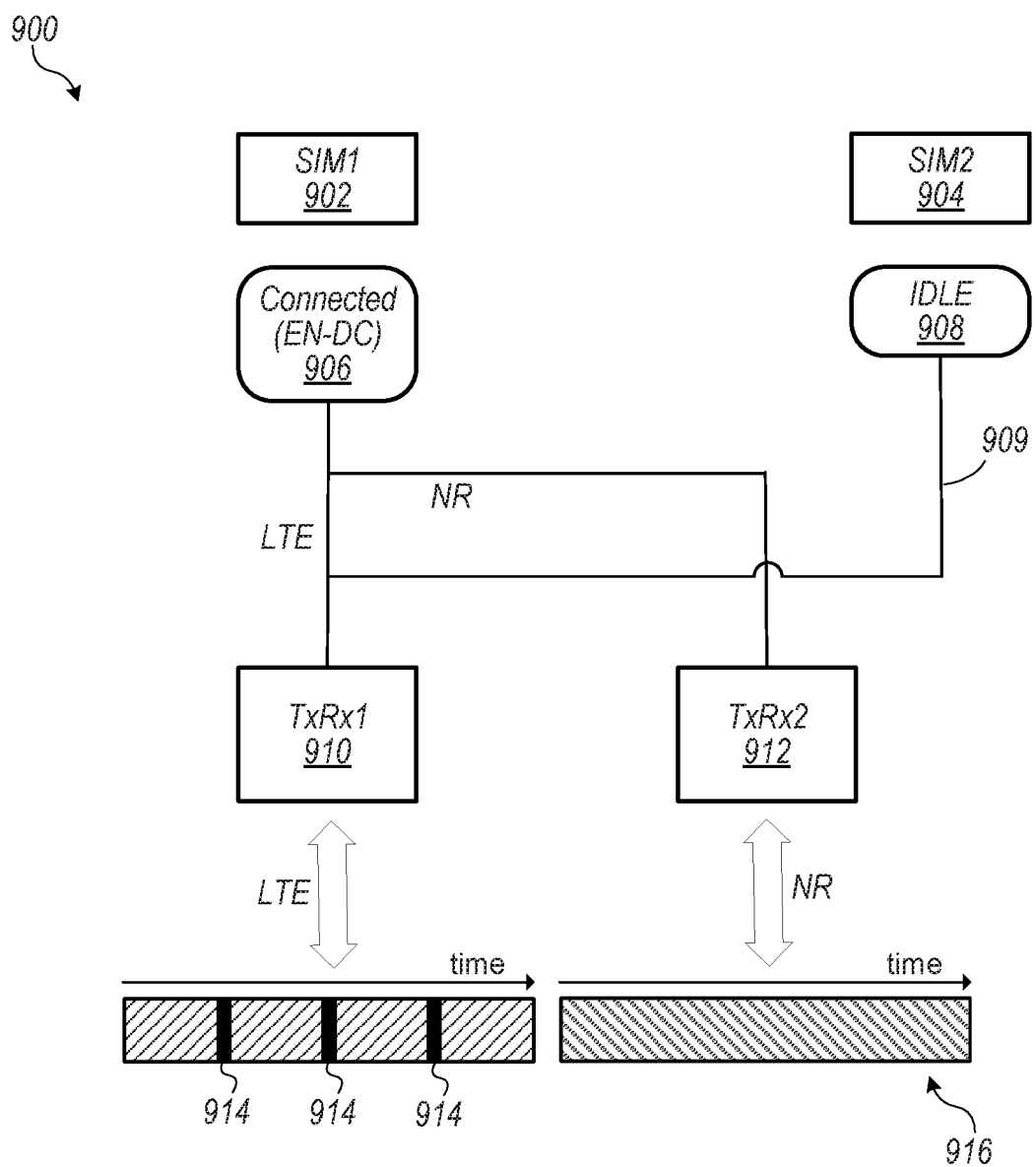
FIG. 9 illustrates one embodiment of a UE device 900 configured to select one of a master cell group (MCG) or a secondary cell group (SCG) to be subjected to paging related tune-away events, according to some embodiments.
Figure 10:
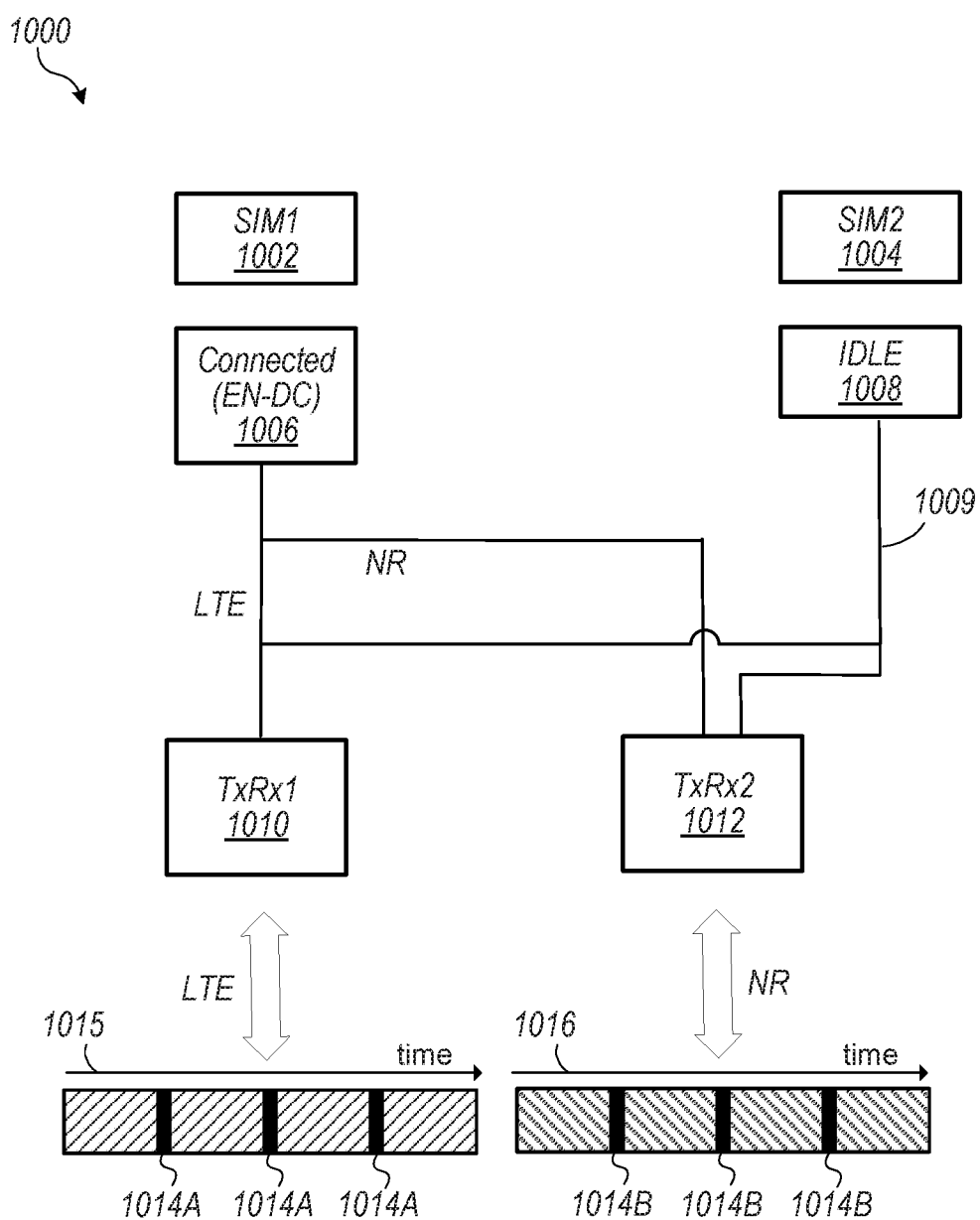
FIG. 10 illustrates one embodiment of a UE device 1000 configured to perform periodic tuning away of RF chains associated with both a master cell group and a secondary cell group, according to some embodiments.

FIGS. 9 and 10—MCG and SCG Handling for EN-DC SIM

FIG. 9 illustrates one embodiment of a multi-SIM user equipment (UE) 900 for MCG and SCG handling when one of the SIMs is in an EN-DC state. (MCG is an acronym for master cell group; SCG is an acronym for secondary cell group. The MCG may be a group of one or more cells hosted by a "master" base station, and the SCG may be a group of one or more cells hosted by a "secondary" base station. In EN-DC, the master base station may be an LTE eNB, and the secondary base station may be a gNB of 5G NR.) This embodiment may be described as a "single tune-away" embodiment.

UE 900 may include a first SIM 902 and a second SIM 904, e.g., as variously described above. UE 900 may also include a first transceiver (TxRx1) 910 and a second transceiver (TxRx2) 912. Each transceiver may include a receiver chain and/or a transmitter chain. Each transceiver may be configured to rapidly change a frequency of tuning. In some embodiments, each transceiver may also be configured to rapidly change direction from transmit to receive, or vice versa.

A processor of the UE 900, operating with respect to an EN-DC connected state 906 of the first SIM 902, may direct the first transceiver 910 to transfer data according to a first wireless communication standard (such as LTE) and the second transceiver 912 to transfer data according to a second wireless communication standard (such as 5G NR. The first transceiver 910 may communicate signals with a base station conforming to the first wireless communication standard (e.g., an LTE base station, commonly referred to as an eNB) in the positively-sloped cross hatch regions. The second transceiver 910 may communicate signals with a base station conforming to the second wireless communication standard (e.g., a 5G NR base station, commonly referred to as a gNB) in the negatively-sloped cross hatch region 916.

As indicated at 909, the processor, also operating with respect to the idle state 908 of the second SIM 904, may direct a selected one of the transceivers to monitor paging for the second SIM, e.g., using 5G NR or any other radio access technology (RAT). In FIG. 9, the first transceiver 910 has been selected. The tune-away gaps 914 (shown in solid black) are periods of time where the page monitoring may be performed, and perhaps also where measurement(s) may be performed, as described above. The non-selected transceiver may be unaffected by the tune-away gaps.

Transceiver selection for tune-away gaps may be based on factors such as: frequency and identity of the connected mode RAT, and frequency and identity of the IDLE Mode RAT (like IntraFrequency); impact to ongoing data transfer; and C-DRX gaps of the two connected mode RATs. (DRX is an acronym for Discontinuous Reception Cycle. C-DRX is an acronym for Connected Mode DRX.)

FIG. 10 illustrates another embodiment of a multi-SIM user equipment (UE) 1000 for MCG and SCG handling when one of the SIMs is in an EN-DC state. (MCG is an acronym for master cell group; SCG is an acronym for secondary cell group.) This embodiment may be described as a "dual tune-away" embodiment.

UE 1000 may include a first SIM 1002 and a second SIM 1004, e.g., as variously described above. The first SIM may be associated with (e.g., subscribed to) a first carrier network. The second SIM may be associated with a second carrier (e.g., subscribed to) a second carrier network. UE 1000 may also include a first transceiver (TxRx1) 1010 and a second transceiver (TxRx2) 1012. Each transceiver may include a receiver chain and/or a transmitter chain. Each transceiver may be configured to rapidly change a frequency of tuning. In some embodiments, each transceiver may also be configured to rapidly change direction from transmit to receive, or vice versa.

A processor of the UE 1000, operating with respect to an EN-DC connected state 1006 of the first SIM 1002, may direct the first transceiver 1010 to perform a first data transfer process according to a first wireless communication standard (such as LTE) and the second transceiver 1012 to perform a second data transfer process according to a second wireless communication standard (such as 5G NR). The first transceiver 1010 may support the first data transfer by communicating signals with a first base station (e.g., an eNB of LTE) of the first carrier network, as indicated by the positively sloped cross hatch regions. The second transceiver 1010 may support the second data transfer by communicating signals with a second base station (e.g., a gNB of 5G NR) of the first carrier network, as indicated by the negatively sloped cross hatch regions. The first and second data transfer processes may be the LTE and NR legs of a dual connection of the UE device with the first and second base stations.

As indicated at 1009, the processor, also operating with respect to the idle state 1008 of the second SIM 1004, may direct both transceivers to temporarily tune away (e.g., from their present operating frequencies to the frequencies of cells of the second carrier network) according to the page schedule associated with the second carrier network, associated with the second SIM, in order to support page monitoring for the second SIM. (The page monitoring may be performed according to 5G NR or any other Radio Access Technology.) The tune-away gaps 1014A and 1014B (shown in solid black) are periods of time where the page monitoring and/or measurement(s) may be performed, e.g., as variously described above. In some embodiments, each of the gaps 1014A may coincide in time with a corresponding one of the gaps 1014B.

UL Scheduling for Split Bearer with EN-DC and Multi-SIM UE

Suppose SIM-1 is in connected mode in EN-DC configuration, and a split bearer is configured. SIM-2 is in IDLE mode and monitoring paging occasions and performing measurements as per the configured DRX cycle.

During a paging occasion of SIM-2, if RF from the NR leg or LTE leg of SIM-1 is tuned away to SIM-2, then there will be an impact to the ongoing data transfer of SIM-1 on the victim leg. If SIM-1 is running a high throughput application, then the tune away gaps will have a visible performance impact. There has not previously been a way to schedule the data away from the victim leg to the non-impacted leg (of the split bearer) in UL and DL.

In some embodiments, the UE and the network may avoid the above-described problems by applying the following methodology.

The network of SIM-1 (in EN-DC configuration) may be provided with the paging pattern of SIM-2. Furthermore, the network of SIM-1 may be informed regarding which dual connectivity leg is subject to being interrupted (due to paging-related tune-away events), to monitor for pages targeting SIM-2.

In response to determining that the UE is entering an idle mode of SIM-2 while in a dual connectivity mode of SIM-1, the network of SIM-1 may allocate a larger number of UL grants (or UL grants per unit time) to the non-victim leg such that the UE can reroute UL data from the victim leg to the non-victim leg, and thus, avoid loss of uplink throughput due to the tune-away events. Likewise, the network of SIM-1 can minimize the negative impact on the UE's downlink dataflow by scheduling a larger amount of DL resources for the UE on the non-victim leg (than it would have if there were no paging-related tune away events on either leg), and stop transmission on victim leg during PO gaps. (PO is an acronym for Paging Occasion.)

This methodology may achieve certain benefits, such as the following. The network (NW) of SIM-1 and the UE can make efficient scheduling decisions, to reduce throughput impact/degradation as the NW knows the UE's preference regarding which RF chain will be tuned away from EN-DC connection to monitor IDLE mode paging of the other SIM.

Recall now the user equipment 600 of FIG. 6. In some embodiments, the radio subsystem 605 may include a plurality of RF chains. Furthermore, in response to determining that the first SIM 620 is entering or has entered a dual connectivity (DC) state and that the second SIM 625 is entering or has entered an idle state, the processing element 610 may: select one of the RF chains to be subjected to monitoring for pages associated with the second SIM; and direct the radio subsystem to transmit page scheduling information and node selection information to a first wireless network corresponding to the first SIM. (The selection represented by the selection information may be based, e.g., on one or more of the criteria discussed above.) A dual connectivity state is a state of connection to two base stations of a wireless network.

The page scheduling information may indicate a sequence (e.g., a periodic sequence) of temporal intervals for said monitoring for pages from a second wireless network corresponding to the second SIM. The node selection information may indicate a selection of one of two dual connectivity nodes associated with the DC state of the first SIM. The selected dual connectivity node is the node that is to be in communication with the selected RF chain during the DC state of the first SIM and at least a portion of the idle state of the second SIM.

In some embodiments, the two dual connectivity nodes may include a master node of the first wireless network and a secondary node of the first wireless network. The master node may conform to a first radio access technology, and the secondary node corresponding to a second radio access technology which is the same as or different from the first radio access technology. For example, the master node may be an LTE eNB while the secondary node may be a gNB of 5G NR.

In some embodiments, the processing element may be further configured to control the selected RF chain to support a data transfer process for the first SIM (e.g., controlled by the first SIM) and said monitoring for pages from the second wireless network for the second SIM. The data transfer process has an uplink direction or a downlink direction. The data transfers of the data transfer process may be performed only outside the temporal intervals of the sequence. The action of monitoring for pages may be constrained to occur only within the temporal intervals of the sequence.

In some embodiments, a wireless user equipment (UE) device may include: a radio subsystem for performing wireless communication, where the radio subsystem includes a plurality of RF chains; a processing element operatively coupled to the radio subsystem; and a plurality of subscriber identity modules (SIMs). Each of the subscriber identity modules may support access to a corresponding wireless network. The processing element may be configured to: in response to determining that a first of the SIMs is entering or has entered a dual connectivity (DC) state and that a second of the SIMs is entering or has entered an idle state, (a) select one of the RF chains to be subjected to monitoring for pages associated with the second SIM, and (b) direct the radio subsystem to transmit page scheduling information and node selection information to a first wireless network corresponding to the first SIM. The page scheduling information may indicate a sequence (e.g., a periodic sequence) of temporal intervals for said monitoring for pages from the second wireless network corresponding to the second SIM. The node selection information may indicate a selection of one of two dual connectivity nodes associated with the DC state of the first SIM. The selected dual connectivity node is to be in communication with the selected RF chain during the dual connectivity state of the first SIM and at least a portion of the idle state of the second SIM.

In some embodiments, the two dual connectivity nodes include a master node of the first wireless network and a secondary node of the first wireless network.

In some embodiments, the master node conforms to a first radio access technology (RAT) and the secondary node corresponding to a second radio access technology the same as or different from the first radio access technology. For example, the first RAT may be LTE while the second RAT is 5G NR.

In some embodiments, the processing element is further configured to: control the selected RF chain to support a data transfer process for the first SIM and said monitoring for pages from the second wireless network for the second SIM. The data transfer process may have an uplink direction or a downlink direction. The data transfers of the data transfer process may be performed only outside the temporal intervals of the sequence. Said monitoring for pages may occur only within the temporal intervals of the sequence.

Figure 11:
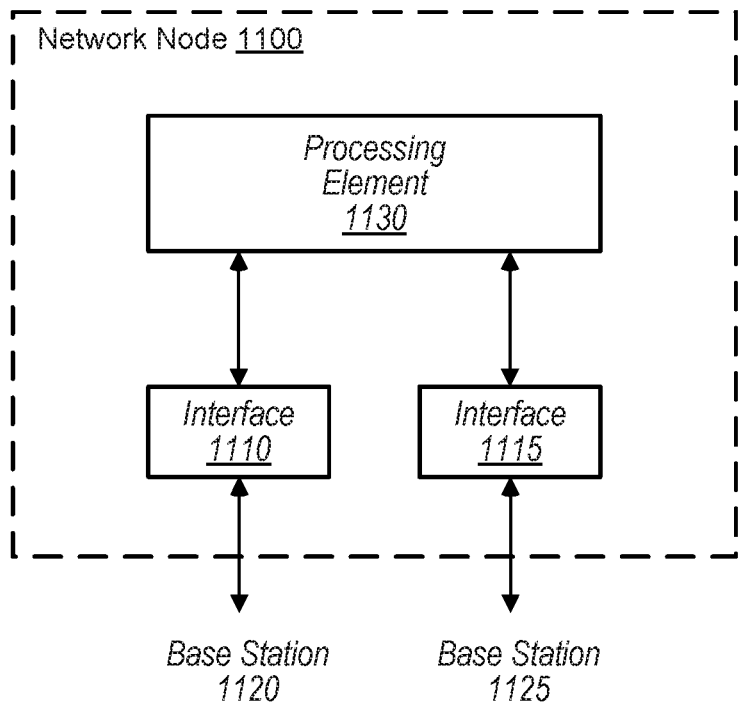
FIG. 11 illustrates one embodiment of a network node 1100, which may be used to improve the scheduling performance of a wireless network that provides dual connectivity to a UE device having more than one SIM, according to some embodiments.

In some embodiments, a network node 1100 may be configured as shown in FIG. 11. The network node may belong to a first wireless network (e.g., a carrier network). The network node may include: an interface 1110 configured to communicate with a first base station 1120 of the first wireless network; an interface 1115 configured to communicate with a second base station 1125 of the first wireless network; and a processing element 1130 coupled to the interfaces. (In an alternative embodiment, the network node may include a single interface that is configured to communicate with the first and second base stations using a scheme of multiple access to a communication medium that connects the network mode to the base stations. For example, the interface may communicate with the base stations in a time multiplexed manner.) The first base station may be configured to wirelessly communicate according to a first radio access technology (such as LTE or 5G NR), and the second base station may be configured to wirelessly communicate according to a second radio access technology (such as LTE or 5G NR). For example, in one embodiment, the first base station is an eNB conforming to the LTE standard while the second base station is a gNB conforming to the 5G NR standard. In another embodiment, the first and second base stations are gNBs.

The processing element 1130 may be configured to receive page scheduling information and node selection information originating from a wireless user equipment (UE) device, e.g., via the interface 1110 or the interface 1115. The page scheduling information may indicate a sequence (e.g., a periodic sequence) of temporal intervals. (The sequence of temporal intervals may correspond to paging opportunities of a second wireless network, i.e., a different carrier network. A base station of the second wireless network may be configured to send pages to the UE device only during the temporal intervals. Thus, the UE device may be configured to monitor for pages from the second wireless number during the temporal intervals.) The node selection information may indicate a selection of either the base station 1120 or the base station 1125.

In response to receiving the page scheduling information and the node selection information, the processing element 1130 may be configured to direct the selected base station to avoid the scheduling of communication resources for the UE device during the temporal intervals of the sequence, and direct a non-selected one of the first and second base stations to increase a rate of scheduling of communication resources for the UE device. These directions may be communicated to the selected and non-selected base stations, e.g., via the interfaces 1110 and 1115.

In some embodiments, the network node 1100 may also include a third interface (not shown), which is configured to receive a user dataflow targeted for the UE device. The processing element may be further configured to send a first portion of the user dataflow to the selected base station and send a second portion of the user dataflow to the non-selected base station. In response to receiving the page scheduling information and the node selection information, the processing element may be further configured to decrease the first portion of the user dataflow to the selected base station and increase the second portion of the user dataflow to the non-selected base station. The selected and non-selected base stations wirelessly transmit their respective portions of the user dataflow to the UE device.

In some embodiments, the processing element may be further configured to direct the selected base station to schedule uplink resources for a second UE device during one or more of the temporal intervals of the sequence.

In some embodiments, a network node in a first wireless network (e.g., a carrier network) may include: a first interface to a first base station of the first wireless network; a second interface to a second base station of the first wireless network; and a processing element configured to: receive page scheduling information and node selection information from a user equipment (UE) device, e.g., via the first interface or the second interface, wherein the page scheduling information indicates a sequence (e.g., a periodic sequence) of temporal intervals. The node selection information may indicate a selection of either the first base station or the second base station. In response to receiving the page scheduling information and the node selection information, the processing element may: direct the selected base station to avoid scheduling of communication resources for the UE device during the temporal intervals of the sequence; and direct a non-selected one of the first and second base stations to increase a rate of scheduling of communication resources for the UE device.

In some embodiments, the network node may also include a third interface configured to receive a user dataflow targeted for the UE device; and the processing element may be further configured to send a first portion of the user dataflow to the selected base station and send a second portion of the user dataflow to the non-selected base station. In response to receiving the page scheduling information and the node selection information, the processing element may be further configured to decrease the first portion of the user dataflow to the selected base station and increase the second portion of the user dataflow to the non-selected base station.

In some embodiments, the processing element may be further configured to direct the selected base station to schedule uplink resources for a second UE device during one or more of the temporal intervals of the sequence.

Reducing Page Resources for Multi-SIM Device

Suppose that a multi-SIM UE device is designed so that only one of the SIMs can be actively connected at any given time. Such a device may be referred to as a single-active device. A Dual SIM Dual Standby (DSDS) device is an example of a single active device. A single active device will not respond to paging if one of the SIMs is in a call. However, the network side may continuously page the UE device, which is a waste of paging resources. The mobile originating (MO) side is eventually sent a message indicating 'paging unreachable', which may mislead the MO user to think that the UE device has an issue with coverage.

In some embodiments, the above described problem may be addressed by the following methodology, especially if two or more of the SIMs in the multi-SIM UE device are registered with the same carrier.

The multi-SIM UE device may send information indicating two or more of the SIMs in the UE to the network during a registration procedure, e.g., using non-access stratum (NAS) signaling. The network may bind these SIMs at the core network (e.g., associate these SIMs with the UE). If one of the SIMs is in a call, the network does not page the UE when the network receives an incoming call associated with any of the other SIMs, in order to avoid a waste of paging resources for a UE that will be unresponsive. (The network may reply to the incoming call originator with a message indicating 'user busy'.) Alternatively, the network may start a 'wait' timer to postpone the page, e.g., until the call under the first SIM is more likely to have been concluded.

In response to an incoming call, the network may cross check to determine if the 'device' is busy instead of determining if the 'subscriber/SIM' is busy.

Even if the SIMs in the multi-SIM UE device are subscribed to different carriers, the above described methodology may be employed if the core networks of the different carriers are configured to co-operate.

The above described methodology may save paging resources; improve key performance indicators (KPIs) of the network by reducing false declarations of "user unreachable"; and improve user experience.

Recall now the wireless user equipment 600 of FIG. 6. In some embodiments, the first SIM 620 and the second SIM 625 may be registered to the same wireless network (e.g., carrier network). Furthermore, the processing element 610 may be configured to direct the radio subsystem to transmit first SIM information contained in the first SIM 620 and second SIM information contained in the second SIM 625 to the wireless network during a procedure for registering the wireless UE device with the wireless network. This action of directing the radio system to transmit the first SIM information and second SIM information may be performed in response to determining that the wireless UE device is a single active device, e.g., a Dual SIM Dual Standby (DSDS) device. (This determination may be performed, e.g., when the UE device is powered on.) The first and second SIM information may be transmitted to a network node (e.g., a node of the network core) via a base station of the wireless network.

In some embodiments, after completing a first call relative to the first SIM 620, the processing element 610 may be configured to: receive a page message from the wireless network, where the page message indicates that a second call targeting a mobile number of the second SIM is incoming; and in response to receiving the page message, connect to the wireless network to receive the second call. (The first and second calls may be phone calls.)

In some embodiments, after completing a first call relative to the first SIM, the processing element 610 may be configured to receive a call attempt notification from the wireless network. The call attempt notification indicates a second call, which targeted a mobile number of the second SIM 625, was attempted during the first call. The processing element may be further configured to display the call attempt notification on a display of the wireless UE device. The call attempt notification may include a phone number of a device that originated the second call. A user of the UE device may elect to call the phone number, i.e., the missed second call.

In some embodiments, a wireless user equipment (UE) device may include: a radio subsystem for performing wireless communication; a processing element operatively coupled to the radio subsystem; and a first subscriber identity module (SIM) and a second SIM, where the first SIM and second SIM are registered to the same wireless network. The processing element may be configured to: in response to determining that the wireless UE device is a single active device, direct the radio subsystem to transmit first SIM information contained in the first SIM and second SIM information contained in the second SIM to the wireless network during a procedure for registering the wireless UE device with the wireless network.

In some embodiments, the processing element may be further configured to: after completing a first call relative to the first SIM, receive a page message from the wireless network, wherein the page message indicates that a second call targeting a mobile number of the second SIM is incoming; and in response to receiving the page message, connect to the wireless network to receive the second call.

In some embodiments, the processing element may be further configured to: after completing a first call relative to the first SIM, receive a call attempt notification from the wireless network, where the call attempt notification indicates a second call, which targeted a mobile number of the second SIM, was attempted during the first call, and display the call attempt notification on a display of the wireless UE device, e.g., as described above.

Figure 12:
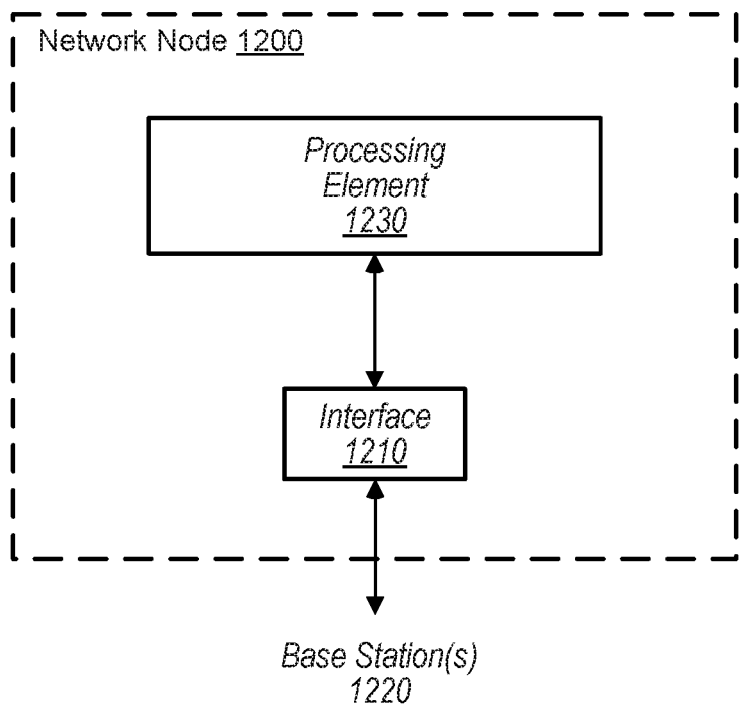
FIG. 12 illustrates one embodiment of a node network 1200, which may be used to reduce the waste of paging resources for UE devices having two or more SIMs, according to some embodiments.

In some embodiments, a network node 1200 in a wireless network may be configured as shown in FIG. 12. The network node may include: an interface 1210 configured to communicate with one or more base stations 1220 of the wireless network; and a processing element 1230 operatively coupled to the interface 1210. The interface may communicate over a wired medium and/or a wireless medium, any of a variety of communication protocols. (In one embodiment, the interface is configured to communicate using an Internet Protocol.) The network node may also include one or more additional interfaces coupled to one or more other nodes of the wireless network, to the Internet, to the PSTN, or to any combination of the foregoing. The network node may be configured to receive in-coming calls and/or make outgoing calls on behalf of UE devices via the one or more additional interfaces.

The processing element 1230 may be configured to: receive first SIM information and the second SIM information from a multi-SIM user equipment (UE) device, e.g., via the interface 1210. In response to receiving the first SIM information and the second SIM information, the processing element may create a data record for the multi-SIM UE device. The data record may be linked to the first SIM information and the second SIM information. In response to establishing a first call to or from a first mobile number associated with the first SIM information, the processing element may set the data record to a busy state. In response to receiving, while the data record is in the busy state, a second call that targets a second mobile number associated with the second SIM information, the processing element may send a response message to an originating device of the second call, and refrain from paging the second mobile number at least for a period of time (e.g., a predetermined amount of time). The response message may indicate that the multi-SIM UE device (or a user of the multi-SIM UE device) is busy.

In some embodiments, the processing element may be configured to start a wait timer in response to receiving the second call, and delay page attempts to the second mobile number until the wait timer has expired.

In some embodiments, in response to determining that the period of time has elapsed (e.g., that the wait timer has expired), the processing element 1230 may determine whether the data record is still in a busy state. In response to determining that the data record is not in a busy state, the processing element may send one or more page messages directed to the second mobile number of the UE device via the interface 1210. If the UE device responds to the one or more page messages, the processing element may establish the second call between the UE device and the originating device of the second call. If the UE device does not respond to the one or more page messages, the processing element may send a message to the originating device, indicating that the UE device is not responsive. In response to determining that the data record is still in the busy state, the processing element may: send a message to the originating device of the second call, indicating that UE device is still busy.

In some embodiments, the processing element may be further configured to: in response to determining that the first call has been terminated, reset the data record to a free state; and in response to receiving another call to the second mobile number while the data record is in the free state, paging the second mobile number.

In some embodiments, a network node in a wireless network may include: an interface configured to communication with a base station of the wireless network; a processing element operatively coupled to the interface. The processing element may be configured to: receive first SIM information and the second SIM information from a multi-SIM user equipment (UE) device, e.g., via the interface; and create a data record for the multi-SIM UE device, wherein the data record is linked to the first SIM information and the second SIM information. In response to establishing a first call to or from a first mobile number associated with the first SIM information, the processing element may set the data record to a busy state. In response to receiving, while the data record is in the busy state, a second call that targets a second mobile number associated with the second SIM information, the processing element may send a response message to an originating device of the second call, and refrain from paging the second mobile number at least for a period of time. The response message may indicate that the multi-SIM UE device (or a user of the multi-SIM UE device) is busy.

In some embodiments, the processing element may be further configured to: start a wait timer in response to receiving the second call, and delay page attempts to the second mobile number until the wait timer has expired.

In some embodiments, the processing element may be further configured to: in response to determining that the first call has been terminated, reset the data record to a free state; and in response to receiving a third call to the second mobile number while the data record is in the free state, paging the second mobile number.

Figure 13:
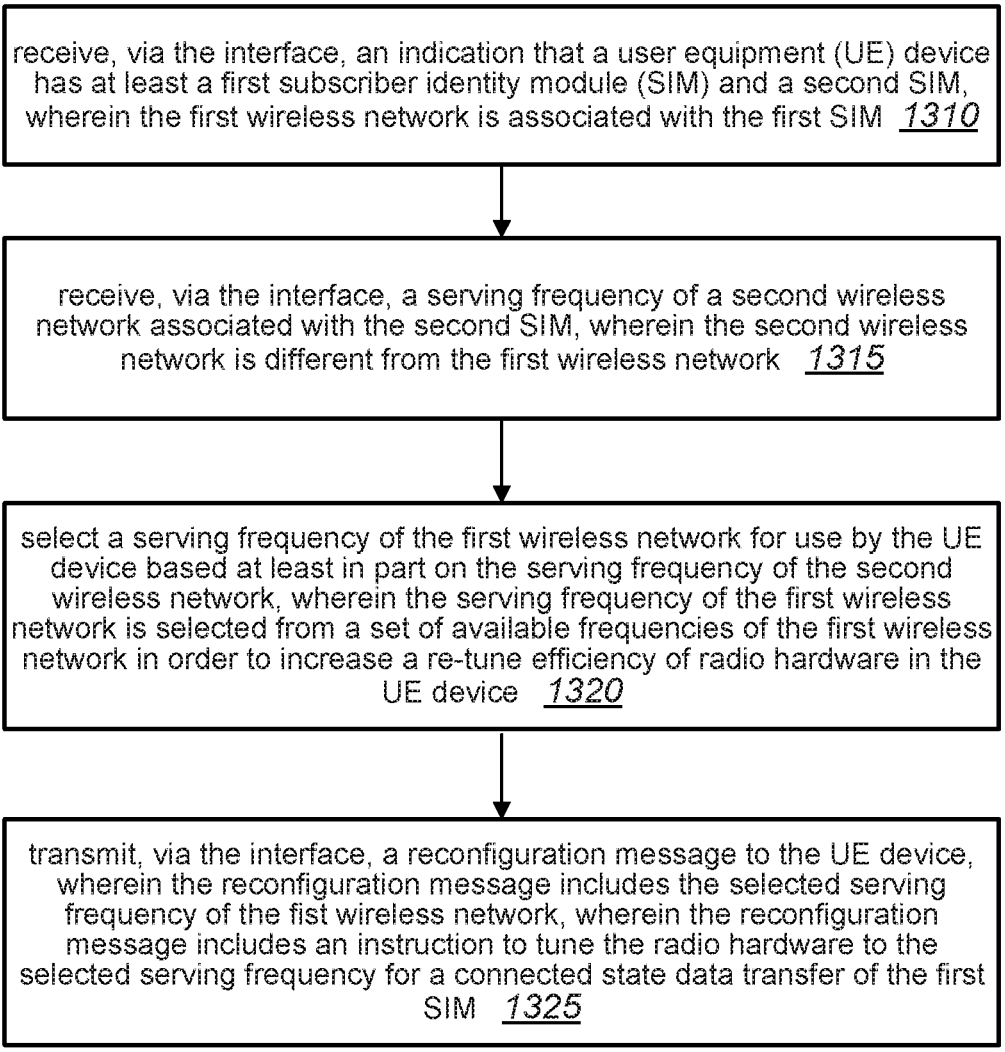
FIG. 13 illustrates one embodiment of a method for reconfiguring a multi-SIM UE device to increase radio re-tune efficiency, especially when a connected mode SIM and an idle mode SIM are assigned to the same RF chain of the UE device, according to some embodiments.

FIG. 13: Reconfiguring a Multi-SIM UE to Improve Radio Re-Tune Efficiency

In some embodiments, a method 1300 for operating a network node in a first wireless network (e.g., a carrier network) may include the operations shown in FIG. 13. (The method 1300 may also include any subset of the features disclosed above in connection with FIGS. 1-12, or below in connection with the following Figures.) The network node may be a node in the core of the first wireless network. The network node may include: an interface configured to communicate with one or more base stations of the first wireless network; and a processing element operatively coupled to the interface. The processing element may be configured to perform the operations of the method.

At 1310, the processing element may receive, via the interface, an indication that a user equipment (UE) device has at least a first subscriber identity module (SIM) and a second SIM, where the first wireless network is associated with the first SIM. The UE device may transmit the indication to the network node via one of the base stations of the first wireless network.

At 1315, the processing element may receive, via the interface, a serving frequency $F_2$ (e.g., a serving frequency of a current cell) of a second wireless network associated with the second SIM. The second wireless network may be different from the first wireless network. (The first and second SIMs may be subscribed to different carriers.) The UE device may transmit the serving frequency $F_2$ to the network node via one of the base stations of the first wireless network. (In an alternative embodiment, the UE device may transmit the server frequency $F_2$ to the network node via a base station of the second wireless network. A core node in the second wireless network may forward the server frequency $F_2$ to the presently discussed network node.) In some embodiments, the above described indication and the serving frequency $F_2$ are transmitted by the UE device as parts of a single message.

At 1320, the processing element may select a serving frequency $F_1$ of the first wireless network for use by the UE device, based at least in part on the serving frequency of the second wireless network. The serving frequency $F_1$ of the first wireless network may be selected from a set $S_{N1}$ of available frequencies of the first wireless network in order to increase (or to maximize) a re-tune efficiency of radio hardware (e.g., an RF chain) in the UE device, e.g., an efficiency of re-tuning from frequency $f \in S_{N1}$ to $F_2$. In some embodiments, re-tune efficiency may be interpreted as the inverse of the time required by the radio hardware to re-tune from one frequency to another. Re-tune efficiency may depend on the values of the starting frequency and destination frequency of the re-tune. Retune efficiency may be maximized if the frequency $F_1$ and $F_2$ are same or if $F_1$ and $F_2$ are in same band. There may be a need to load appropriate calibration information when RF has to retune to another frequency, and that can be avoided if calibration information is the same within each band and the two SIMs are assigned to frequencies in same band. Retune efficiency may also depend on whether there is a band conflict in receive operations on the two SIMs or there is a band conflict on transmission by first SIM over reception of other SIM. This may be especially important, e.g., for a DR-DSDS device. (DR-DSDS is an acronym for "Dual Receive-Dual SIM Dual Standby".)

At 1325, the processing element may transmit, via the interface, a reconfiguration message to the UE device, wherein the reconfiguration message includes the selected serving frequency $F_1$ of the first wireless network. The reconfiguration message may include an instruction for the UE device to tune the radio hardware (e.g., RF chain) to the selected serving frequency for a connected-state data transfer of the first SIM.

In some embodiments, the method 1300 may also include transmitting, via the interface, a configuration message to a first of the one or more base stations, e.g., a base station that is to take the role of a serving cell for the first SIM of the UE device. The configuration message may be an instruction indicating that the first base station should tune an RF chain of the first base station to the selected frequency $F_1$ in order to support the connected-state data transfer of the first SIM. The UE device may periodically tune away from $F_1$ to $F_2$ according to a paging schedule configured for the second SIM relative to the second wireless network. As variously described above, the paging schedule may indicate a sequence of temporal intervals used by the UE device to monitor for paging from the second wireless network. At the start of each of the temporal intervals the UE device may: re-tune one of its RF chains from $F_1$ to $F_2$, thus interrupting the connected-state data transfer; and re-tune back to $F_1$ at the end of the temporal interval, to resume the connected-state data transfer.

The serving frequency $F_2$ of the second wireless network may be received using any of a variety of protocols. For example, in some embodiments, the serving frequency is received using non-access stratum (NAS) signaling. In other embodiments, the serving frequency $F_2$ is received using access stratum (AS) signaling.

FIG. 14: Reconfiguration of a Multi-SIM UE to Decrease Re-Tuning Events

In some embodiments, a method 1400 for operating a wireless user equipment (UE) device may include the operations shown in FIG. 14. (The method 1400 may also include any subset of the features disclosed above in connection with FIGS. 1-13, or below in connection with the following Figures.) The UE device may include: a radio subsystem for performing wireless communication; a processing element operatively coupled to the radio subsystem; and a plurality of subscriber identity modules (SIMs). Each of the subscriber identity modules may support access to a corresponding wireless network. (In some embodiments, the UE device may include any subset of the features described above, e.g., in connection with FIG. 4 and/or FIG. 6.) The processing element may be configured to perform the operations of method 1400. The processing element may perform receiving and/or transmitting operations using the radio subsystem, e.g., by receiving baseband signals from and/or supplying baseband signals to the radio subsystem, and by asserting control signals to control the state and functionality of the radio subsystem.

At 1410, the processing element may receive a reconfiguration message from a first wireless network corresponding to a first of the SIMs.

At 1415, in response to receiving the reconfiguration message, the processing element may reconfigure a serving cell frequency for a data connection of the first SIM with the first wireless network, to decrease or eliminate frequency re-tuning events on an RF chain that supports both the data connection of the first SIM and monitoring of pages of a second wireless network associated with a second of the SIMs.

In some embodiments, the serving cell frequency for the data connection may be reconfigured from a current frequency to a frequency indicated by the reconfiguration message.

In some embodiments, the UE device may be a Dual Receive-Dual SIM Dual Standby (DR-DSDS) device. In other embodiments, the UE device may be a Single Receiver-Dual SIM Dual Standby (SR-DSDS) device.

In some embodiments, the frequency indicated by the reconfiguration message may be a serving cell frequency of the second wireless network.

In some embodiments, the frequency indicated by the reconfiguration message may have a property that a time required for tuning away the RF chain from the indicated frequency to a second frequency used for said monitoring is smaller than a time required for tuning away the RF chain from the current frequency to the second frequency.

In some embodiments, the processing element may be configured to direct a transmission of one or more serving frequencies of the second wireless network, associated with the second SIM, to the first wireless network.

As an example of method 1400, suppose that the radio subsystem includes two receivers but only one transmitter; the first SIM (SIM-1) is initially tuned to frequency $F_1$; the second SIM (SIM-2) is tuned to $F_2$; and, in a dual-receive mode of operation, both SIMs are able to simultaneously receive from the two respective networks, i.e. no conflict exists. However, at a later time, SIM-1 is handed over to a frequency $F_3$, and $F_3$ conflicts with $F_2$. Then the UE cannot simultaneously receive on the two receivers mapped to the two respective SIMs, unless the frequency of one of them is changed to avoid conflict scenarios. Thus, in this situation, if the network (NW) reconfigures SIM-1's frequency from $F_3$ to $F_4$, where $F_4$ does not conflict with $F_2$, then the two SIMs may again receive in parallel on the two receivers—SIM-1 being tuned to $F_4$ and SIM-2 being tuned to $F_2$. After this frequency reconfiguration, there may be no need to tune away or retune for either of the two SIMs. The method 1400 may be especially useful when the UE device is a DR-DSDS device.

In some embodiments, retuning may be avoided (although, there may still be a gap in reception of SIM-1), e.g., when an RF chain is configured or reconfigured to receive paging (and support measurement) for SIM-2 on the same frequency as SIM-1's data connection to the first wireless network.

Figure 15B:
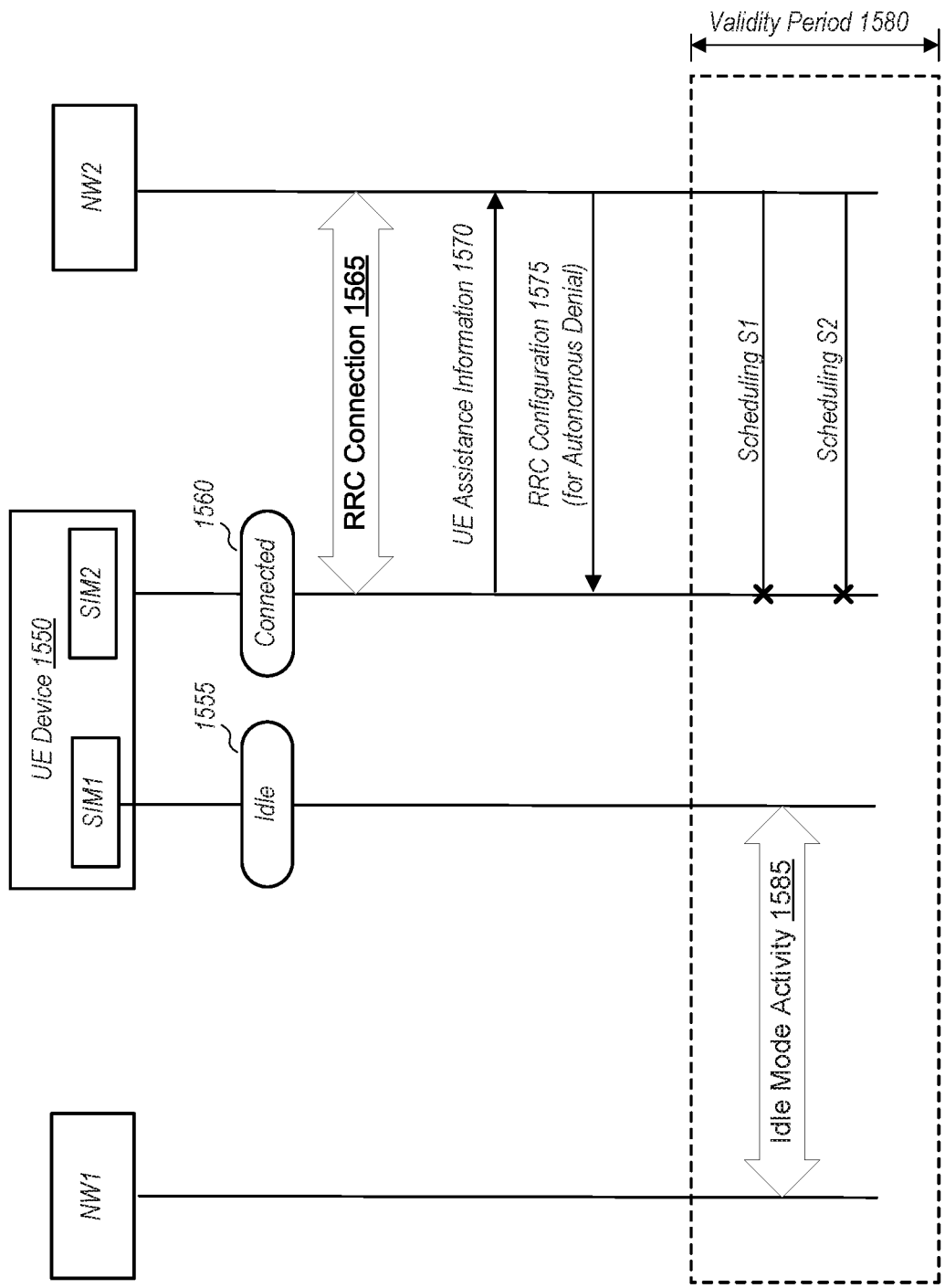
FIG. 15B illustrates one embodiment of a method that enables a multi-SIM UE device to autonomously deny transmissions of a connected mode SIM, but with limited denial probability, according to some embodiments.

FIGS. 15A & 15B—Autonomous Denial

In some embodiments, a method 1500 for operating a wireless user equipment (UE) device may include the operations shown in FIG. 15A. (The method 1500 may also include any subset of the features disclosed above in connection with FIGS. 1-14, or below in connection with the following Figures.) The wireless UE device may include: a radio subsystem for performing wireless communication; a processing element operatively coupled to the radio subsystem; and a plurality of subscriber identity modules (SIMs). Each of the subscriber identity modules may support access to a corresponding wireless network. A first of the SIMs may be associated with a first wireless network, and a second of the SIMs may be associated with a second wireless network different from the first wireless network. (In some embodiments, the UE device may include any subset of the features described above in connection with FIG. 4 and/or FIG. 6.) The processing element may be configured to perform the operations of method 1500.

At 1510, the processing element may receive a configuration message from the first wireless network, where the configuration message includes an indication of a denial probability threshold (or a maximum denial probability).

At 1515, in response to receiving the configuration message, the processing element may control a percentage of time an RF chain of the radio subsystem is tuned away from a first frequency, corresponding to a connection with the first wireless network, to a second frequency of the second wireless network. The action of controlling the time percentage may be based on (e.g., limited by) the denial probability threshold. The connection with first wireless network may be associated with a connected state of the first SIM. As part of said controlling, the processing element may autonomously determine which scheduled transfers of the connection will be denied, subject to the denial probability threshold. For example, by deciding to tune away the RF chain from the first frequency, the processing element may be denying a scheduled uplink transfer (of the connection) from the first SIM, or may be denying a scheduled downlink transfer (of the connection) targeted for the first SIM. The processing element may limit the percentage of time the RF chain is tuned away from the first frequency so that the percentage is no more than the denial probability threshold. (Wherever the non-strict inequality ≤ is mentioned in the present disclosure, it should be understood that alternative embodiments may utilize the strict inequality <. Similarly, wherever the non-strict inequality ≥ is mentioned, alternative embodiments may utilize the strict inequality >.)

In some embodiments, the processing element may be configured to perform said controlling so that a probability of forfeited grants of uplink resources with respect to said connection with the first wireless network is no more than the denial probability threshold.

In some embodiments, the processing element may be configured to perform said controlling so that a probability of missed downlink transmissions with respect to said connection with the first wireless network is no more than the denial probability threshold.

In some embodiments, the processing element may be configured to direct the radio subsystem to transmit a device type indication to the first wireless network (e.g., via a base station of the first wireless network). The device type indication may indicate that the UE device has a plurality of SIMs. The first wireless network may transmit the configuration message to the UE device in response to receiving the device type indication.

In some embodiments, the configuration message may be received using a Radio Resource Control (RRC) protocol.

In some embodiments, an autonomous denial procedure such as method 1500 may provide benefits such as the following. It may enable the network (e.g., NW2 of FIG. 15B) to control the scheduling loss probability due to multi-SIM UE devices. Otherwise, the network (NW) may have little or no knowledge of the scheduling loss probability. The autonomous denial procedure may enable the NW to more accurately evaluate the NW/UE scheduling performance. For example, if the autonomous denial procedure for multi-SIM UEs is configured with a 1% denial probability limit, and if the total probability of scheduling loss is 21%, the NW may exclude the probability contribution of the multi-SIM UEs, and adjust the scheduling loss probability to 20%, which may be further considered for NW deployment optimization.

In some embodiments of an autonomous denial procedure, the NW may provide an autonomous denial configuration to the UE via the SIM-1 connection. For example, the UE may be allowed to deny 2 scheduled transmission opportunities within 200 ms (corresponding to a denial probability limit of 1%, assuming a scheduled transmission opportunity duration of 1 ms). When the NW evaluates the UE scheduling performance, the NW may exclude the 1% contribution of multi-SIM UEs from the statistics.

FIG. 15B illustrates an autonomous denial procedure according to some embodiments. A UE device 1550 may include a first SIM (SIM1) and a second SIM (SIM2). The first SIM may be associated with a first network (NW1), and the second SIM may be associated with a second network (NW2). For example, the first and second SIMs may be subscribed to different carrier networks. The first SIM may be in an idle state 1555, and the second SIM may be in a connected state 1560. The second SIM may establish a Radio Resource Control (RRC) connection 1565 with the second network. The second network may receive UE assistance information 1570 from the second SIM (or, from a processing element of the UE device operating on behalf of the second SIM). The UE assistance information may include an indication that the UE device is a multi-SIM device, i.e., a device having more than one SIM. (In some embodiments, the second network may operate without any further information regarding the SIMs in the UE device.)

In response to the UE assistance information, the second network (NW2) may send RRC configuration information 1575, enabling the UE device (or the second SIM) to configure itself for autonomous denial of scheduled data transfers under the second SIM. The RRC configuration information may include a denial probability threshold (or limit). The denial probability threshold may be expressed in any of various forms, e.g., in terms of a validity period 1580 and a denial time limit. For example, a validity period of 200 ms and a denial time limit of 2 ms would correspond to a denial probability threshold of 1%=2/200. The denial time limit may limit the amount of time that an RF chain of the UE device is tuned away from the connection of the second SIM to service idle mode activity 1585 (such as paging, measurement, and system information decode) for the first SIM. Thus, the number of scheduled transfers of the second SIM's connection that are denied by the second SIM is limited. As illustrated in FIG. 15B, two scheduled subframes (S1 and S2) are denied, as indicated by the X marks. Thus, the second network may control the negative impact on the second SIMs connection, via the denial probability threshold.

FIG. 16—Informing the Network to Improve Scheduling Performance for Multi-SIM UE In some embodiments, a method 1600 for operating a wireless user equipment (UE) device may include the operations shown in FIG. 16. (The method 1600 may also include any subset of the features disclosed above in connection with FIGS. 1-15, or below in connection with the following Figures.) The wireless UE device may include: a radio subsystem for performing wireless communication; a processing element operatively coupled to the radio subsystem; and a plurality of subscriber identity modules (SIMs). Each of the subscriber identity modules may support access to a corresponding wireless network, where the SIMs include a first SIM and a second SIM. (In some embodiments, the UE device may include any subset of the features disclosed above in connection with FIG. 4 and/or FIG. 6.) The processing element may be configured to perform the operations of method 1600.

At 1610, the processing element may select at least one of a first RF chain and a second RF chain of the radio subsystem that is to be subjected to idle mode activity for the second SIM during a dual connectivity (DC) state of the first SIM, e.g., as variously described above.

At 1615, the processing element may direct the radio subsystem to transmit a selection indicator to a first wireless network associated with the first SIM. The selection indicator may indicate a selection of at least one of a master cell group (MCG) and a secondary cell group (SCG) associated with the dual connectivity state of the first SIM. The selection indicated by the selection indicator may be determined based on said selecting (i.e., the result of said selecting) at least one of the first RF chain and the second RF chain. For example, if the selecting operation 1610 selects the first RF chain, the selection indicator may indicate the cell group (MCG or SCG) that is associated with (or assigned to) the first RF chain. The first wireless network may instruct the selected cell group to avoid the scheduling of downlink and/or uplink resources to the UE device during paging opportunities associated with the idle mode activity of the second SIM.

In some embodiments, the method 1600 may also include directing the radio subsystem to transmit activity pattern information to the first wireless network. The activity pattern information may indicate a sequence (e.g., a periodic sequence) of temporal intervals for performing said idle mode activity. The idle mode activity may include one or more of page monitoring, system information block (SIB) decoding, and idle mode measurement. The first wireless network may instruct the selected cell group (MCG and/or SCG) of the dual connectivity state to avoid scheduling downlink and/or uplink transmissions of the dual connectivity state of the first SIM during the temporal intervals.

In some embodiments, the method 1600 may also include directing the radio subsystem to transmit a frequency of a serving cell of a second wireless network corresponding to the second SIM. The serving cell frequency of the second wireless network may be transmitted to the first wireless network, and used, e.g., as variously described above.

In some embodiments, only one of the first RF chain and second RF chain is selected for being subjected to the idle mode activity for the second SIM. In these embodiments, method 1600 may also include: in the DC state of the first SIM and an idle state of the second SIM, controlling the selected RF chain to support (a) a first data transfer process for the dual connectivity state of the first SIM and (b) said idle mode activity for the second SIM. The first data transfer process may have either an uplink direction or a downlink direction.

In some embodiments, the method 1600 may also include: in the DC state of the first SIM and the idle state of the second SIM, control a non-selected one of the first RF chain and the second RF chain to support a second data transfer process for the DC state of the first SIM, wherein the non-selected RF chain is not subjected to the idle mode activity of the second SIM while in the DC state of the first SIM and the idle state of the second SIM. The second data transfer process may have the same transfer direction (uplink or downlink) as the first data transfer process.

In some embodiments, both of the first RF chain and second RF chain are selected for being subjected to the idle mode activity for the second SIM. In these embodiments, the method 1600 may also include: in the DC state of the first SIM and the idle state of the second SIM, controlling each of the first RF chain and the second RF chain to support a corresponding data transfer process for the first SIM and said idle mode activity for the second SIM.

In some embodiments, the first and second base stations may conform to different (or the same) radio access technologies (RATs). For example, in the context of EN-DC (E-UTRA NR Dual Connectivity), one of the base stations may be an LTE base station (eNB) while the other may be a 5G NR base station (gNB).

In some embodiments, the method 1600 may also include transmitting page scheduling information to the first wireless network. The page scheduling information may include any subset of the following: a Discontinuous Reception (DRX) cycle; a page offset; and an interruption time that indicates a length of each of said temporal intervals; or any. In one embodiment, the page scheduling information may include the DRX. In another embodiment, the page scheduling information may include the page offset. In yet another embodiment, the page scheduling information may include the interruption time.

FIG. 17: Call Handling for Multi-SIM UE

In some embodiments, a method 1700 for operating a network node in a wireless network may include the operations shown in FIG. 17. (The method 1700 may also include any subset of the features disclosed above in connection with FIGS. 1-16, or below in connection with the following Figures.) The network node may be a node in the core network of the wireless network. The network node may include: an interface configured to communicate with one or more base stations of the wireless network; and a processing element operatively coupled to the interface. The processing element may be configured to perform the operations of method 1700.

At 1710, the processing element may create a data record for a UE device having a plurality of subscriber identity modules (SIMs). The data record may be linked to first SIM information and second SIM information of the UE device. The first SIM information corresponds to a first SIM of the UE device, and the second SIM information corresponds to a second SIM of the UE device. The data record may be stored in a memory of the network node.

At 1715, in response to establishing a first call to or from a first mobile number associated with the first SIM information, the processing element may set the data record to a busy state. The network node may include a second interface to one or more other nodes of the wireless network, to the Internet, to the Public Switched Telephone Network (PSTN), or to any combination of the foregoing. The network node may receive incoming calls via the second interface, and/or, make outgoing calls (on behalf of UE devices) via the second interface.

At 1720, the processing element may, in response to receiving, while the data record is in the busy state, a second call that targets a second mobile number associated with the second SIM information, refrain from paging the second mobile number at least for a period of time (e.g., a predetermined duration of time).

In some embodiments, the method 1700 may also include receiving the first SIM information and the second SIM information from the user equipment (UE) device via the interface. The UE device may transmit the first SIM information and the second SIM information to the network node via a currently serving base station of the wireless network.

In some embodiments, the method 1700 may also include: in response to receiving the second call while the data record is in the busy state, sending a response message to an originating device of the second call. The response message may indicate that the UE device (or a user of the UE device) is busy.

In some embodiments, the method 1700 may also include starting a wait timer in response to receiving the second call, and delay page attempts to the second mobile number until the wait timer has expired.

In some embodiments, the method 1700 may also include: starting a wait timer in response to receiving the second call; and while the wait timer is running, monitoring for an end of the first call in order to attempt to establish the second call after the end of the first call, and/or sending a response message to an originating device of the second call, indicating that an establishment of the second call is being attempted.

In some embodiments, the method 1700 may also include, in response to the wait timer expiring before the end of the first call, sending another response message to the originating device of the second call, indicating that the UE device (or a user of the UE device) is busy.

In some embodiments, the method 1700 may also include: in response to determining that the first call has been terminated, reset the data record to a free state; and in response to receiving a third call to the second mobile number while the data record is in the free state, paging the second mobile number.

Embodiments of the present disclosure may be realized in any of various forms. For example, some embodiments may be realized as a computer-implemented method, a computer-readable memory medium, or a device. Other embodiments may be realized using one or more custom-designed hardware devices such as ASICs. Still other embodiments may be realized using one or more programmable hardware elements such as FPGAs.

In some embodiments, a device may include: an antenna subsystem; a radio coupled to the antenna subsystem; and a processing element operably coupled to the radio, where the device is configured to implement any or all parts of any of the preceding embodiments.

In other embodiments, an apparatus may include means for performing any or all of the elements of any of the preceding embodiments.

In yet other embodiments, an apparatus may include a processing element configured to cause a device to perform any or all of the elements of any of the preceding embodiments.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) in communication with a base station may be the basis of a corresponding method for operating a base station, by interpreting each message/signal X received by the UE in the downlink as a message/signal X transmitted by the base station, and each message/signal Y transmitted in the uplink by the UE as a message/signal Y received by the base station.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless user equipment (UE) device comprising:
a radio subsystem for performing wireless communication;
a processing element operatively coupled to the radio subsystem;
a plurality of subscriber identity modules (SIMs), wherein each of the subscriber identity modules supports access to a corresponding wireless network;
wherein the processing element is configured to:
receive a reconfiguration message from a first wireless network corresponding to a first SIM of the plurality of SIMS; and
in response to receiving the reconfiguration message, reconfigure a serving cell frequency for a data connection of the first SIM of the plurality of SIMs with the first wireless network, to decrease or eliminate frequency re-tuning events on an RF chain that supports both the data connection of the first SIM and monitoring paging of a second wireless network associated with a second SIM of the plurality of SIMS.

2. The wireless UE device of claim 1, wherein the serving cell frequency for the data connection is reconfigured from a current frequency to a frequency indicated by the reconfiguration message, wherein the UE device is a Dual Receive Dual SIM Dual Standby device.

3. The wireless UE device of claim 2, wherein the frequency indicated by the reconfiguration message is a serving cell frequency of the second wireless network.

4. The wireless UE device of claim 2, wherein the frequency indicated by the reconfiguration message has a property that a time required for tuning away the RF chain from the frequency indicated by the reconfiguration message to a second frequency used for said monitoring is smaller than a time required for tuning away the RF chain from the current frequency to the second frequency.

5. The wireless UE device of claim 1, wherein the processing element is configured to:
direct a transmission of one or more serving frequencies of the second wireless network associated with the second SIM, to the first wireless network.

6. An apparatus comprising a processing element configured to cause a user equipment (UE) device to perform operations, wherein the UE device includes a plurality of subscriber identity modules (SIMs), wherein each of the subscriber identity modules supports access to a corresponding wireless network, wherein the operations include:
decoding a reconfiguration message from a first wireless network corresponding to a first SIM of the plurality of SIMs; and
in response to decoding the reconfiguration message, reconfiguring a serving cell frequency for a data connection of the first SIM of the plurality of SIMs with the first wireless network, to decrease or eliminate frequency re-tuning events on an RF chain that supports both the data connection of the first SIM and monitoring paging of a second wireless network associated with a second SIM of the plurality of SIMS.

7. The apparatus of claim 6, wherein the serving cell frequency for the data connection is reconfigured from a current frequency to a frequency indicated by the reconfiguration message, wherein the UE device is a Dual Receive Dual SIM Dual Standby device.

8. The apparatus of claim 7, wherein the frequency indicated by the reconfiguration message is a serving cell frequency of the second wireless network.

9. The apparatus of claim 7, wherein the frequency indicated by the reconfiguration message has a property that a time required for tuning away the RF chain from the frequency indicated by the reconfiguration message to a second frequency used for said monitoring is smaller than a time required for tuning away the RF chain from the current frequency to the second frequency.

10. The apparatus of claim 6, wherein the operations also include:
   directing a transmission of one or more serving frequencies of the second wireless network associated with the second SIM, to the first wireless network.

11. A network node of a first wireless network, the network node comprising a processing element configured to cause the network node to:
   select a serving cell frequency of the first wireless network, for use by a user equipment device having at least a first subscriber identity module and a second subscriber identity module, wherein the serving cell frequency is for a data connection of the first subscriber identity module with the first wireless network, wherein the serving cell frequency is selected to be:
      within a same band as a frequency used by the second subscriber identity module for page monitoring of a second wireless network; and
      different from said frequency used by the second subscriber identity module for page monitoring of the second wireless network; and
   transmit a reconfiguration message that includes the selected serving cell frequency, wherein the reconfiguration message instructs the user equipment device to reconfigure the serving cell frequency for the data connection of the first subscriber identity module to the selected serving cell frequency.

12. The network node of claim 11, wherein the processing element is further configured to cause the network node to:
   prior to said selecting, receive the frequency used by the second subscriber identity module for said page monitoring,
   wherein said transmitting the reconfiguration message enables the user equipment device to decrease a time required to retune to the frequency used by the second subscriber identity module for said paging.

13. The network node of claim 12, wherein the frequency used by the second subscriber identity module for said page monitoring is received from the user equipment device via a base station of the first wireless network.

14. The network node of claim 12, wherein the frequency used by the second subscriber identity module for said page monitoring is received from a core node in the second wireless network.

15. The network node of claim 11, wherein the processing element is further configured to cause the network node to receive the frequency used by the second subscriber identity module for paging monitoring of the second wireless network from a base station of the first wireless network.

16. The network node of claim 11, wherein said reconfiguration message instructs the user equipment device to tune its radio hardware to the selected serving cell frequency for a connected-state data transfer of the first subscriber identity module.

17. The network node of claim 16, wherein said transmitting the reconfiguration message enables the user equipment device to increase a re-tune efficiency for retuning the radio hardware when switching between the connected-state data transfer of the first subscriber identity module and the page monitoring of the second subscriber identity module.

18. The network node of claim 11, further comprising an interface configured to communicate with first and second base stations of the first wireless network, wherein the first base station is configured to wirelessly communicate according to a Long Term Evolution standard, wherein the second base station is configured to wireless communicate according to a 5G New Radio standard.

19. The network node of claim 11, wherein the user equipment device is a Dual Receive-Dual SIM Dual Standby, DR-DSDS, device.

20. The network node of claim 11, wherein said selected serving cell frequency avoids a band conflict between the first subscriber identity module and the second subscriber identity module.

* * * * *